United States Patent
Volotinen et al.

(10) Patent No.: US 11,653,172 B2
(45) Date of Patent: May 16, 2023

(54) DETERMINING WHETHER A TRACKING DEVICE IS WITHIN AN AREA OF INTEREST BASED ON AT LEAST ONE SET OF RADIO SIGNAL OBSERVATION RESULTS CAPTURED BY A TRACKING DEVICE

(71) Applicant: HERE Global B.V., Eindhoven (NL)

(72) Inventors: Minja Volotinen, FI (FI); Mika Viitala, Tampere (FI); Simon Madine, Edinburgh (GB)

(73) Assignee: HERE Global B.V., Eindhoven (NL)

( * ) Notice: Subject to any disclaimer, the term of this patent is extended or adjusted under 35 U.S.C. 154(b) by 43 days.

(21) Appl. No.: 17/100,323

(22) Filed: Nov. 20, 2020

(65) Prior Publication Data

US 2022/0167116 A1    May 26, 2022

(51) Int. Cl.
| | | |
|---|---|---|
| H04W 4/021 | (2018.01) | |
| H04W 4/029 | (2018.01) | |
| G01S 5/02 | (2010.01) | |

(52) U.S. Cl.
CPC .......... *H04W 4/021* (2013.01); *G01S 5/0295* (2020.05); *H04W 4/029* (2018.02)

(58) Field of Classification Search
CPC ....... H04W 4/021; H04W 4/029; H04W 4/33; G01S 5/0295; G01S 5/02526; G01S 2205/02; G01S 5/02523
See application file for complete search history.

(56) References Cited

U.S. PATENT DOCUMENTS

| | | | |
|---|---|---|---|
| 8,275,020 B1 * | 9/2012 | Frost | ......................... H04L 9/16 375/140 |
| 9,386,415 B2 | 7/2016 | Li et al. | |

(Continued)

FOREIGN PATENT DOCUMENTS

JP    2017201240 A    11/2017

OTHER PUBLICATIONS

Office Action for related European Patent Application No. 212079243.8-1218, dated Apr. 4, 2022, 10 pages.

(Continued)

*Primary Examiner* — Marcos L Torres
(74) *Attorney, Agent, or Firm* — Ditthavong, Steiner & Mlotkowski

(57) ABSTRACT

It is inter-alia disclosed a method comprises:
  obtaining or holding available at least one training set of radio signal observation results, wherein a respective training set of radio signal observation results is held available in association with identification information of a corresponding area of interest on a site, wherein a respective training set of radio signal observation results is captured at a corresponding observation position within a corresponding area of interest on said site;
  obtaining or holding available area of interest information indicating whether at least one tracking device has been determined to have entered and/or to have been located within a corresponding area of interest on the site;
  obtaining or holding available current radio signal observation data of a current tracking device representing one or more current sets of radio signal observation results captured by a radio interface of the current tracking device when present on said site, wherein a respective current set of radio signal observation results is captured at a corresponding observation position on said site;
  determining whether the current tracking device has entered or is located within an area of interest, identification information of which is associated with the at least one training set of radio signal observation results, based on at least one current set of radio signal observation results, based on at least one training set of radio signal observation results associated with the identifi- (Continued)

cation information of the area of interest, and based on the area of interest information.

20 Claims, 10 Drawing Sheets

(56) References Cited

U.S. PATENT DOCUMENTS

| | | |
|---|---|---|
| 9,430,781 B1 | 8/2016 | Kerr et al. |
| 10,379,514 B2 | 8/2019 | Balraj |
| 2010/0076968 A1* | 3/2010 | Boyns ..................... G06F 16/29 715/825 |
| 2015/0081583 A1 | 3/2015 | Butler et al. |
| 2016/0183050 A1* | 6/2016 | Yiu ....................... H04W 24/10 455/456.1 |
| 2018/0279067 A1 | 9/2018 | Ivanov et al. |
| 2018/0338031 A1 | 11/2018 | Subramanian et al. |

OTHER PUBLICATIONS

"Indoor Geofencing", inpixon Indoor Intelligence, retrieved on Nov. 20, 2020 from https://www.inpixon.com/use-cases/geofencing, 4 pages.

Notice of Reasons for Refusal for related Japanese Patent Application No. JP2021-186275, dated Jan. 17, 2023, 10 pages.

* cited by examiner

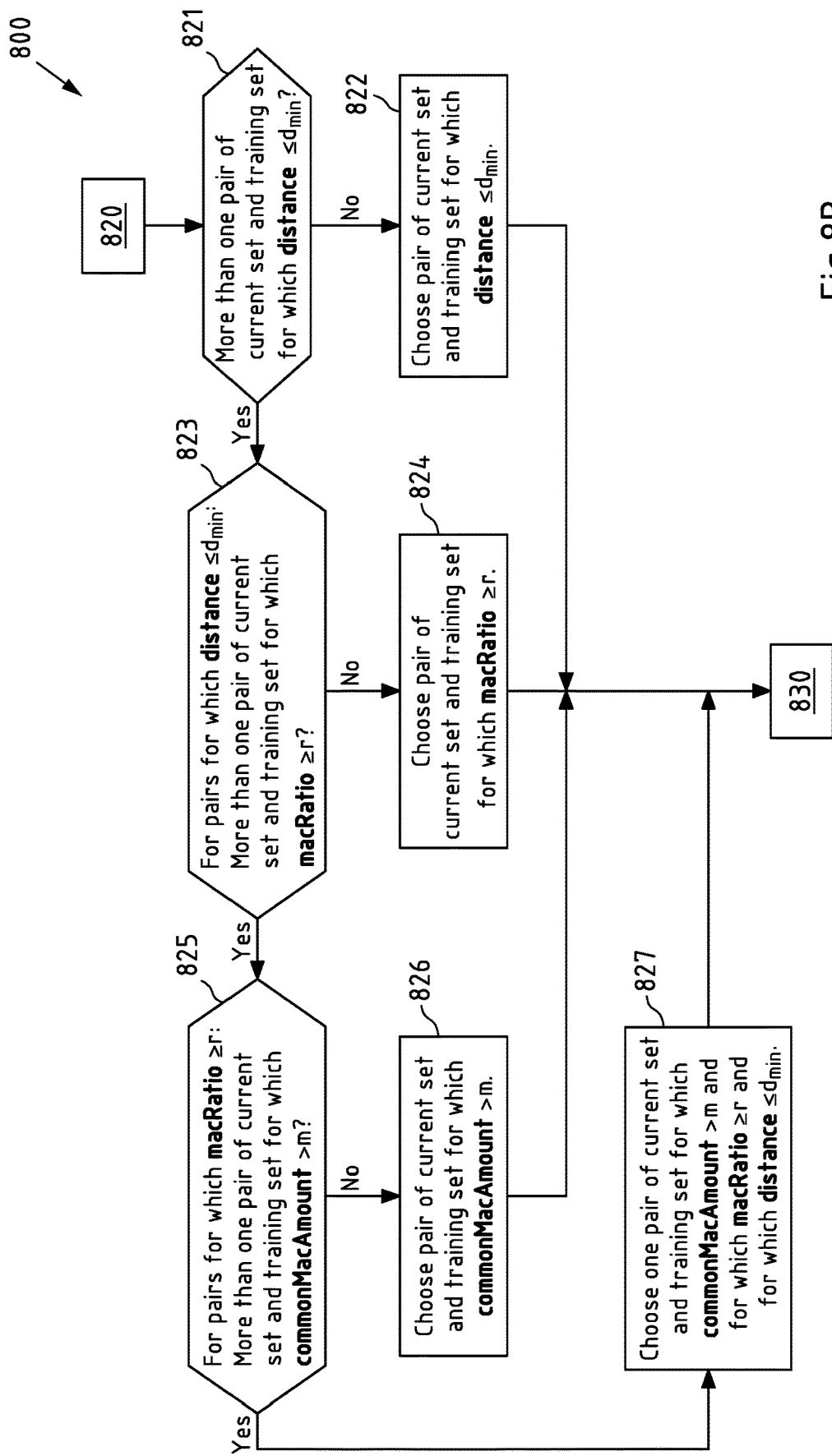

DETERMINING WHETHER A TRACKING DEVICE IS WITHIN AN AREA OF INTEREST BASED ON AT LEAST ONE SET OF RADIO SIGNAL OBSERVATION RESULTS CAPTURED BY A TRACKING DEVICE

FIELD OF THE DISCLOSURE

The invention relates to the field of non-GNSS based positioning, for example to the field of determining whether a tracking device is within an area of interest based on at least one set of radio signal observation results.

BACKGROUND

Satellite signal based positioning technologies may suitably be used outdoors for example for navigation of vehicles or pedestrian navigation. While in general, satellite signals may be observable also indoors, walls and roofs of buildings may deteriorate satellite signal quality. In view of this, dedicated non-GNSS based radio positioning systems have been developed during the past years that may likewise be used for indoor and outdoor positioning. Examples include systems that are based on pseudolites, which are ground-based GPS like short-range beacons, ultra-sound positioning systems, Bluetooth low energy (BLE) based positioning systems, cellular network positioning systems and Wireless Local Area Network (WLAN) based positioning systems.

In order to set up and/or maintain a non-GNSS based radio positioning system, a system may initially or continuously be trained. To this end, training data may be collected which in existing systems may be collected in form of radio fingerprints. Thereby, a radio fingerprint may comprise or indicate an observation position and a set of radio signal observation results captured when scanning for radio signals at the observation positions. Training may be a continuous background process, in which tracking devices, for example mobile devices, continuously report collected radio fingerprints according to a predefined time schedule to a positioning cloud and/or to a positioning server. This process is commonly referred to as crowd-sourcing and may be used to generate a radio map for example for a certain site such as a building or part of a building and part of the outdoor surroundings, wherein such radio map then corresponds to a collection of fingerprints that may be acquired over time by a plurality of tracking devices such as mobile devices.

Such radio map may then enable positioning for example of tracking or mobile devices within the site. To this end, for example a mobile device, using for example a dedicated software application, may estimate its current position based on a current measurement of its radio environment to obtain a current set of radio signal observation results and based on the radio map that may be available from the training process.

Existing positioning systems may enable definition of one or more geofences for a tracking device or a mobile device. In existing approaches, a geofence typically defines a boundary of a geographical area of interest based on geographical coordinates of the boundary. Such geofence may then enable triggering an event at a mobile device of a user (e.g. a visible notification and/or a sound at the mobile device) or an event at a remote device when the mobile device passes or traverses a boundary defined by a geofence when entering or exiting a corresponding area of interest. While such definition and use of geofences based on geographical coordinates may work satisfactorily in particular in outdoor environments where GNSS satellite positioning is often available, this approach may face difficulties in indoor environments where it is often not possible to determine a GNSS satellite position and where radio maps may not yet be provided or where crowdsourcing procedures for generating radio maps are not possible.

SUMMARY OF SOME ASPECTS OF THE INVENTION

In this section, aspects of the invention are disclosed.

According to an exemplary aspect of the present disclosure, a method is disclosed, the method comprising:

obtaining or holding available at least one training set of radio signal observation results, wherein a respective training set of radio signal observation results is held available in association with identification information of a corresponding area of interest on a site, wherein a respective training set of radio signal observation results is captured at a corresponding observation position within a corresponding area of interest on said site;

obtaining or holding available area of interest information indicating whether at least one tracking device has been determined to have entered and/or to have been located within a corresponding area of interest on the site;

obtaining or holding available current radio signal observation data of a current tracking device representing one or more current sets of radio signal observation results captured by a radio interface of the current tracking device when present on said site, wherein a respective current set of radio signal observation results is captured at a corresponding observation position on said site;

determining whether the current tracking device has entered or is located within an area of interest, identification information of which is associated with the at least one training set of radio signal observation results, based on at least one current set of radio signal observation results, based on at least one training set of radio signal observation results associated with the identification information of the area of interest, and based on the area of interest information.

In an exemplary embodiment, this method is performed by one or more apparatuses.

This method may for instance be performed and/or controlled by an apparatus, e.g. enabling a network side. The apparatus may for instance be a server, e.g. a positioning server e.g. of or in communication with a communication network, e.g. a cellular network and/or a WLAN communication network. Alternatively or in addition, this method may be performed and/or controlled by more than one apparatus, for instance one or more servers corresponding to a server cloud comprising at least two servers. Alternatively or in addition, the apparatus may for instance be a tracking device and/or mobile device. For instance, the method may be performed and/or controlled by using at least one processor of the apparatus.

Alternatively, the method according to the exemplary aspect may be performed by at least two apparatuses, in particular by the server and the tracking device cooperating together to perform the respective method. In an exemplary embodiment the site is a predetermined environment, for example a predetermined indoor and/or urban environment, for instance inside and/or outside of a building or a complex of buildings (e.g. a hospital, a shopping center, a parking garage, a train station, a bus station, an airport, a company site etc.). On the site, availability of global navigation satellite system (GNSS) satellite signals may for example be limited so that the tracking device may not be in a position to reliably estimate its position based on GNSS satellite signals. Further, a radio map may not be available on the site so that the tracking device may for example not be in the position to reliably estimate its position based on such radio map. It is noted that in the context of the present disclosure, a tracking device is not necessarily a mobile device but may be a simpler device configured at least for obtaining radio signal observation data representing one or more sets of radio signal observation results captured by a radio interface of the tracking device when present on a site, wherein a respective set of radio signal observation results is captured at a corresponding observation position on said track. Nevertheless, the present disclosure is not limited in this respect. In other words, in an exemplary embodiment, the tracking device is or corresponds to a mobile device, e.g. a smart phone, a tablet computer, a notebook, a smart watch and/or a smart band.

According to a further exemplary aspect of the invention, a computer program is disclosed, the computer program when executed by a processor causing an apparatus, for instance a server, to perform and/or control the actions of the method according to the exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, an apparatus is disclosed, configured to perform and/or control or comprising respective means for performing and/or controlling the method according to the exemplary aspect.

Thus, according to a further exemplary aspect of the invention, an apparatus is disclosed comprising means for:
   obtaining or holding available at least one training set of radio signal observation results, wherein a respective training set of radio signal observation results is held available in association with identification information of a corresponding area of interest on a site, wherein a respective training set of radio signal observation results is captured at a corresponding observation position within a corresponding area of interest on said site;
   obtaining or holding available area of interest information indicating whether at least one tracking device has been determined to have entered and/or to have been located within a corresponding area of interest on the site;
   obtaining or holding available current radio signal observation data of a current tracking device representing one or more current sets of radio signal observation results captured by a radio interface of the current tracking device when present on said site, wherein a respective current set of radio signal observation results is captured at a corresponding observation position on said site;
   determining whether the current tracking device has entered or is located within an area of interest, identification information of which is associated with the at least one training set of radio signal observation results, based on at least one current set of radio signal observation results, based on at least one training set of radio signal observation results associated with the identification information of the area of interest, and based on the area of interest information.

The means of the apparatus can be implemented in hardware and/or software. They may comprise for instance at least one processor for executing computer program code for performing the functions, at least one memory storing the program code, or both. Alternatively, they could comprise for instance circuitry that is designed to implement the functions, for instance implemented in a chipset or a chip, like an integrated circuit. In general, the means may comprise for instance one or more processing means or processors.

According to a further exemplary aspect of the invention, an apparatus is disclosed, comprising at least one processor and at least one memory including computer program code, the at least one memory and the computer program code configured to, with the at least one processor, cause an apparatus, for instance the apparatus, at least to perform and/or to control the method according to the exemplary aspect.

The above-disclosed apparatus according to any aspect of the invention may be a module or a component for a device, for example a chip. Alternatively, the disclosed apparatus according to any aspect of the invention may be a device, for instance a server or server cloud. The disclosed apparatus according to any aspect of the invention may comprise the disclosed components, for instance means, processor, memory, or may further comprise one or more additional components.

In the following, further exemplary features of the method according to the exemplary aspects are described.

As disclosed in more detail herein, the method according to the exemplary aspect may serve for avoiding oscillations in determining whether a tracking device has entered or is located within an area of interest, in particular when the tracking device is close to a boundary between respective areas of interest.

Obtaining data or information (e.g. radio signal observation data or setting information) may be understood to mean receiving (e.g. by means of a communication interface) or capturing (e.g. by means of a sensor and/or a radio interface) or determining (e.g. by means of a processor) the data or the information. Holding available data (e.g. radio signal observation data or setting information) may be understood to mean storing the data (e.g. in a storing means like a memory). Thus, for example the radio signal observation data may be obtained by receiving or storing or determining the respective radio signal observation data.

The radio signal observation data may represent or enable estimating a position of a tracking device present on the site. The radio signal observation data may be obtained by capturing the radio signal observation data (e.g. by a radio interface) at the tracking device and/or by receiving the radio signal observation data at the server and/or the cloud from the tracking device. While a single set of radio signal observation results may suffice for implementing a method in accordance with aspects of the present disclosure, the radio signal observation data may represent a sequence (e.g. a chronological sequence) of sets of radio signal observation results captured by a radio interface of a corresponding tracking device at subsequent observation positions on the site. A respective set of radio signal observation results may indicate respective radio signal characteristics of radio signals such as WLAN and/or Bluetooth signals observed by the radio interface of the tracking device at the same observation position when the respective set of radio signal observation results was captured.

For example, the radio interface of the tracking device may repeatedly scan for radio signals like WLAN and/or Bluetooth signals when the tracking device is present on the site to capture one or more sets of radio signal observation results. Thereby, a specific radio signal may be understood to be observed by the radio interface of the tracking device if this specific radio signal is detected or received by the radio interface when scanning for radio signals.

Thereby, in an exemplary embodiment, a respective set of radio signal observation results includes for each observed radio signal at least one of the following radio signal characteristics: (1) irrespective indication or a received signal strength (2) a respective indication of a signal-to-noise ratio and (3) a respective identifier of a radio node.

An identifier of a radio node may be understood to mean information contained in an observable radio signal which is configured to enable identifying the radio node transmitting the radio signal and/or distinguishing the radio signals transmitted by the radio node from other radio signals. Examples for such an identifier for a radio node are a name, an address (e.g. a MAC address or an IP address), a universally unique identifier (UUID), a service set identifier (SSID), a basic service set identifier (BSSID) or a combination thereof. For example, an identifier of such a radio node may be obtained by extracting the identifier from the observed radio signal.

A radio node may be understood to be a radio device like an access point, e.g. a Wireless Local Area Network (WLAN) access point or a Bluetooth beacon. Thereby, WLAN is for example specified by the standards of the IEEE 802.11 family (http://www.ieee.org/). The Bluetooth standards are specified by the Bluetooth Special Interest Group and are presently available under https://www.bluetooth.com. Accordingly, radio signals which are expected to be observable on the site may be in particular WLAN and/or Bluetooth signals. It is noted that the present disclosure is not to be limited in this respect such that a radio node may further correspond to a based station of a cellular communication system. Thereby, a cellular communication system may for example be a mobile phone network like a 2G/3G/4G/5G cellular communication network. The 2G/3G/4G/5G radio communication standards are developed by the 3GPPP and are presently available under http://www.3gppp.org/.

Thus, an apparatus according to an exemplary aspect (e.g. a tracking device and/or one or more servers and/or a cloud) may obtain or hold available the radio signal observation data which may for example be included in a database in form of a queue. For example, in an exemplary embodiment, the respective set of radio signal observation results is associated with respective timestamp data representing a respective capture time of the respective set of radio signal observation results. The database or queue may thus hold available radio signal observation data representative of a sequence of sets of radio signal observation results, e.g. the chronological order being defined by respective captured times.

Further, in an exemplary embodiment, radio signal observation data of a tracking device is associated with tracking device identification information identifying the tracking device. For example, tracking device identification information may correspond to or comprise an identifier of the tracking device such as a name and/or an address, e.g. MAC address or IP address. Thus, based on the tracking device identification information associated with the radio signal observation data of a tracking device, the database or queue may hold available radio signal observation data of one or more tracking devices whereby radio signal observation data for example representative of a sequence of sets of radio signal observation results of a particular tracking device may be discoverable in the queue or the database based on the tracking device identifier identification information. In addition, a particular set of radio signal observation results captured by a tracking device at a respective observation position may be discoverable based on the timestamp data associated with a set of radio signal observation results.

It is noted that the database or queue may be held available by the apparatus according to an exemplary aspect (e.g. by the tracking device and/or the one or more servers and/or the cloud), whereby the database or queue may be held available for at least 24 hours. In certain situations, radio signal observation data of a tracking device may be removed from the queue or database after 24 hours to enable compliance with privacy regulations, e.g. GDPR requirements.

In an exemplary embodiment, setting information may be obtained (e.g. at a server from an external apparatus such as a user's mobile device and/or a user's personal computer) to indicate one or more sets of radio signal observation results that are for example held available in the database or the queue, for example based on a respective capture time of the respective one or more sets of radio signal observation results.

For example, when a tracking device has collected radio signal observation data representing a sequence of sets of radio signal observation results, the sets of radio signal observation results being captured at respective observation positions on a track, the radio signal observation data may be provided to a server and/or a cloud to be held available at the queue. For example based on knowledge of a time at which, or a time interval during which, the tracking device was positioned within the area of interest, a user may for example use an external apparatus such as a mobile device or a different remote apparatus such as a personal computer to provide setting information to the one or more servers to indicate the time and/or the time interval during which the radio signal observation data was collection within the area of interest.

Thus, in an exemplary embodiment, the setting information is obtained from an external device, e.g. from a mobile device and/or from a personal computer.

It is noted that in an alternate example, setting information may be obtained for example at a tracking device as a result of a user pressing a button for example using a user interface such as a graphic user interface of the tracking device If at least one of the one or more sets of radio signal observation results is indicated as the at least one training set, the at least one training set of radio signal observation data is then associated with identification information of an area of interest on said site. For example, to this end, the at least one training set may be added to a dedicated database in association with said identification information of the area of interest, e.g. by storing the training set and the identification information in association in a dedicated storage device such as a memory. In an exemplary embodiment, the at least one training set of radio signal observation data is stored in association with identification information of an area of interest on said site in a database, in particular at the apparatus, in particular at the at least one server and/or at the tracking device.

Thereby, in an exemplary embodiment, identification information of the area of interest comprises at least one of:
- a name of the area of interest;
- information of a building in which the area of interest is located;
- information of a floor of a building on which the area of interest is located;
- geographical coordinates of the area of interest.

According to an exemplary embodiment of the exemplary aspect, a respective set of radio signal observation results is associated with respective time stamp data representing a respective capture time of the respective set of radio signal observation results, and wherein the setting information indicates at least one capture time, the method further comprising:
- determining the at least one training set of radio signal observation results to be indicated as training set of radio signal observation results by the setting information based on the capture time indicated by the setting information and based on the capture time represented by time stamp data associated with the at least one training set of radio signal observation results.

Time stamp data may for example be understood to represent a date and a time of day captured by a clock for example in UNIX time format. As mentioned above, based on such timestamp data, a respective set of radio signal observation results captured at a certain observation position on the site may be associated with a respective captured time which enables to hold respective radio signal observation data available as a sequence in chronological order. It may thus become possible to later on define a subgroup of sets of radio signal observation results captured on the site based on knowledge of a time or time interval during which the tracking device had been positioned within the area of interest.

In an exemplary embodiment, the at least one training set of radio signal observation results is determined to be indicated by the setting information as training set of radio signal observation results if the capture time represented by the time stamp data associated with the training set of radio signal observation results is equal to or later than the capture time indicated by the setting information.

Thus, it may be sufficient if only one capture time is indicated, whereby for example respective sets of radio signal observation results captured after the time indicated by the setting information until an end of capturing sets of radio signal observation results by the tracking device may be indicated as respective training sets. Alternatively, a single training set of radio signal observation results may be determined to be indicated by the setting information when this single training set of radio signal observation results is associated with a capture time equal to or later than the capture time indicated by the setting information.

In an exemplary embodiment, the setting information indicates at least two capture times representative of a capture time interval, or indicates the capture time interval, the method further comprising:
- determining the at least one training set of radio signal observation results to be indicated by the setting information as training set of radio signal observation results if the capture time represented by the time stamp data associated with the training set of radio signal observation results is equal to one of the at least two capture times or is within the capture time interval.

Thus, likewise, the setting information may indicate such interval which may be defined by a single capture time and a pre-defined time range, or which may be indicated by two respective capture times, i.e. a start capture time and an end capture time.

In an exemplary embodiment, the obtaining or holding available the radio signal observation data comprises obtaining or holding available radio signal observation data of at least two tracking devices, and wherein the setting information includes tracking device identification information of a respective one of the two tracking devices, the method further comprising:
- determining whether tracking device identification information included in the setting information corresponds to tracking device identification information of a respective one of the at least two tracking devices; and
- associating said at least one training set of radio signal observation results with said identification information identifying the area of interest on said site if the tracking device identification information included in the setting information is determined to correspond to tracking device identification information of a respective one of the at least two tracking devices.

Thus, as mentioned, the queue or database may hold available radio signal observation data of one or more tracking devices, whereby respective radio signal observation data may be associated with corresponding tracking device identification information. It may thus become possible that a remote user may indicate, based on knowledge that one or more tracking devices have been located at a certain area of interest within the respective time intervals, for example to the one or more servers and/or to the cloud the respective tracking device identification information in association with the respective time interval such that corresponding sets of radio signal observation results may be associated with identification information of the area of interest.

In an exemplary embodiment, respective radio signal observation data further include sensor data captured by one or more sensors of a corresponding tracking device when present on said site; wherein the sensor data are at least one of:
- temperature sensor data;
- inertial sensor data;
- motion sensor data;
- barometer/altitude sensor data.

Thus, in addition to radio signal observation results obtained from one or more respective radio nodes, a tracking device may further capture data from respective sensors of the tracking device. Such sensor data may on the one hand help to provide a further characterization of the environment within which the tracking device moves along the track. To this end, the tracking device may further capture for example temperature sensor data. In addition or alternatively, the tracking device may capture inertial sensor data and/or motion sensor data which may enable a further characterization of the path along which the tracking device has moved during its movement along the path. Barometer and/or altimeter or altitude sensor data may in an exemplary embodiment enable or support determining a floor/level of the site, e.g. of at least part of a building.

In an exemplary embodiment, respective sensor data captured at an observation position are associated with radio signal observation results captured at the observation position. In this way, the sensor data may be retrieved later on and may be used for further characterization of the path and/or of an area of interest. In the latter case, in an exemplary embodiment, the method according to the exemplary aspect may further comprise:

associating at least one training set of radio signal observation results with sensor data, wherein the sensor data is captured at an observation position at which the at least one training set of radio signal observation results is captured.

In this way, the sensor data may for example be used as additional or assistance data in evaluating whether a tracking device has entered an area of interest defined by the training set of radio signal observation results.

A further aspect relates to determining whether a tracking device has entered or is positioned within an area of interest and in particular to an approach for reducing evaluation oscillations that may occur when a tracking device is e.g. at a boundary between two areas of interest.

In an exemplary embodiment, the method according to the exemplary aspect further comprises:
  obtaining or holding available current radio signal observation data of a tracking device representing one or more current sets of radio signal observation results captured by a radio interface of the current tracking device when present on said site, wherein a respective current set of radio signal observation results is captured at a corresponding observation position on said site;
  determining whether the tracking device has entered or is located within an area of interest identification information of which is associated with the at least one training set of radio signal observation results based on at least one current set of radio signal observation results and based on the at least one training set of radio signal observation results;
  providing notification information or causing an alert if it is determined that the tracking device is within the area of interest.

For example, the tracking device or a further tracking device may be present (again) within the area of interest for which identification information is associated with the training set as described above. The tracking device may provide one or more current sets of radio signal observation results e.g. to the one or more servers and/or to the cloud, the one or more servers and/or the cloud thus obtaining the one or more current sets of radio signal observation results. In such situation, for example at one of the servers, an evaluation may be performed whether or not at least one of the one or more current set of radio signal observation results corresponds to (or is similar to) at least one training set of radio signal observation results held available at the database disclosed above. In this way, it may be determined whether the tracking device has entered or is located within an area of interest identification information of which is associated with the at least one training set of radio signal observation results.

In the affirmative case, if it is determined that the tracking device is within the area of interest, notification information may be provided e.g. to the remote apparatus such as a user's mobile device or a user's personal computer or to the tracking device and/or an alert may be caused (e.g. a sound may be triggered) at the remote apparatus and/or at the tracking device.

Thus, the above disclosed procedures enable defining a type of geofence that is independent of geographical coordinates. Based thereon, the following aspect may help to avoid switching between determination results that a tracking device is within an area of interest or within a neighboring area of interest, e.g. in case the tracking device is at or close to a boundary of two areas of interest.

Thus, in accordance with an exemplary aspect of the present disclosure, a method may comprise
  obtaining or holding available at least one training set of radio signal observation results, wherein a respective training set of radio signal observation results is held available in association with identification information of a corresponding area of interest on a site, wherein a respective training set of radio signal observation results is captured at a corresponding observation position within a corresponding area of interest on said site;
  obtaining or holding available area of interest information indicating whether at least one tracking device has been determined to have entered and/or to have been located within a corresponding area of interest on the site;
  obtaining or holding available current radio signal observation data of a current tracking device representing one or more current sets of radio signal observation results captured by a radio interface of the current tracking device when present on said site, wherein a respective current set of radio signal observation results is captured at a corresponding observation position on said site;
  determining whether the current tracking device has entered or is located within an area of interest, identification information of which is associated with the at least one training set of radio signal observation results, based on at least one current set of radio signal observation results, based on at least one training set of radio signal observation results associated with the identification information of the area of interest, and based on the area of interest information.

As disclosed above, the apparatus, e.g. the one or more servers, the cloud and/or the tracking device may hold available (e.g. store or access a storing device comprising) a database, where training sets of radio signal observation results are held available in association with corresponding identification information of a respective area of interest. It is noted that one area of interest may be associated with one or more training sets of radio signal observation data. Further, in an exemplary embodiment, a training set of radio signal observation results may be associated with tracking device identification information. Thus, for example in this way, the database may hold available several training sets for one or more corresponding areas of interest and for one or more corresponding tracking devices.

In an exemplary embodiment, the database may further hold available said area of interest information indicating whether at least one tracking device has been determined to have entered and/or to have been located within a corresponding area of interest on the site. For example, area of interest information for a certain area of interest may be held available in association with said area of interest. The area of interest information may correspond to information indicative of a number of times that a tracking device (e.g. the tracking device which has provided the training set(s) associated with the identification information of the area of interest) has been determined to have entered or have been located within the area of interest. For example, the information may correspond to a number of zero after a training set of radio signal information has been associated with corresponding identification information of an area of interest and may be successively increased a respective time when the tracking device for example re-enters the area of interest.

For example, when a tracking device moves along a path on said site continuously providing current radio signal observation results and re-enters the area of interest a second time, a determination of whether or not the (current) tracking device has entered or is located within a different area of interest may then take into account in addition to a current set of radio signal observation results and a training set of radio signal observation results corresponding to the different area of interest also said area of interest information which in this example corresponds to a number "one" indicating that the (current) tracking device has before been determined to have re-entered the area of interest already one time. If in this case, the determination would have resulted in determining that the tracking device is in the different area of interest without taking into account this area of interest information, the same determination yields that the tracking device is inside the area of interest indicated by this area of interest information if the determination takes into account the area of interest information.

Such processing may advantageously prevent for example that a tracking device moving along a boundary between two areas of interest or entering an area of interest close to a boundary of a different area of interest is determined to be in the one or the other area of interest in an oscillating fashion. In other words, the method according to this aspect enables attributing a measure representative of the fact that it is likely that a tracking device is again within an area of interest in which the tracking device has been determined to be in a previous determination.

In other words, in an exemplary embodiment, if it is determined based on the at least one training set of radio signal observation results and the at least one current set of radio signal observation results that the current tracking device has entered or is located within an area of interest, identification information of which is associated with the at least one training set of radio signal observation results, the method further comprises:
  determining whether the current tracking device has previously entered or was previously located within the same area of interest, the method further comprising at least one of:
    if it is determined that the current tracking device has previously entered or was previously located within the same area of interest, determining that the current tracking device has entered or is located within the same area of interest;
    if it is determined that the current tracking device has previously entered or was previously located within a different area of interest, determining that the current tracking device has entered or is located within the different area of interest.

Thus, as disclosed above, the area of interest information enables attributing a weight to an area of interest which has been entered by a tracking device already before such that undesirable area of interest oscillations according to which a tracking device is determined to be within one or another area of interest in an oscillating fashion may be prevented.

In an exemplary embodiment, the method further comprises at least one of:
  if it is determined that the current tracking device has previously entered or was previously located within the same area of interest, providing notification information and/or or causing an alert indicating that the current tracking device is within the same area of interest;
  if it is determined that the current tracking device has previously entered or was previously located within a different area of interest, providing notification information and/or or causing an alert indicating that the current tracking device is within the different area of interest.

As disclosed further herein, a notification may be displayed and/or an alert (e.g. a sound) may be caused at the remote apparatus further disclosed herein and/or at the tracking device. Thereby, a user may be notified that the tracking device has entered or is determined to be within said area of interest.

In an exemplary embodiment, the area of interest information is associated with one or more areas of interest and indicates whether at least one tracking device has been determined to have entered and/or to have been located within at least one of the one or more areas associated with the one or more areas of interest associated with the area of interest information. Thereby if it is determined that the current tracking device has not previously entered an area of interest associated with the area of interest information or was previously located within an area of interest associated with the area of interest information, the method comprises:
  determining that the current tracking device has entered or is located within the area of interest, identification information of which is associated with the at least one training set of radio signal observation results.

In other words, if the area of interest information does not hold available any area of interest which has been entered by the tracking device before, e.g. if the tracking device enters the area of interest the first time, the determination of whether the tracking device is within the area of interest essentially corresponds to the determination without making use of the area of interest information.

In an exemplary embodiment, the method further comprises:
  if it is determined that the current tracking device has not previously entered an area of interest associated with the area of interest information or was previously located within an area of interest associated with the area of interest information, providing notification information and/or or causing an alert indicating that the current tracking device has entered or is located within the area of interest, identification information of which is associated with the at least one training set of radio signal observation results.

Similarly, as disclosed further herein, a notification may be displayed and/or an alert (e.g. a sound) may be caused at the remote apparatus further disclosed herein and/or at the tracking device. Thereby, a user may be notified that the tracking device has entered or is determined to be within said area of interest.

As disclosed further herein, determination of whether or not a tracking device has entered or is within an area of interest may in an exemplary embodiment be independent in particular of geographical coordinates of the area of interest. In an exemplary embodiment, the determination may e.g. be based on a similarity between current radio signal observation results obtained while a tracking device is moving along a path and training radio signal observation results held available e.g. in said database.

In other words, in an exemplary embodiment, determining whether the current tracking device is located within the area of interest is based on a parameter representative of a similarity between the at least one current set of radio signal observation results and the at least one training set of radio signal observation results associated with the identification information of the area of interest.

Thus, in an exemplary embodiment, determining whether for at least one training set of radio signal observation results and for at least one current set of radio signal observations results, a parameter representative of a similarity between the at least one training set of radio signal observation results and the at least one current set of radio signal observation results is below a first threshold value.

As mentioned, a set of radio signal observation results may include for one observation position one or more radio signal parameters, whereby a radio signal parameter may correspond to a respective indication of a received signal strength; a respective indication of a signal-to-noise ratio; and/or a respective identifier of a radio node. In other words, in an exemplary embodiment, for a corresponding observed radio signal at least one of:
 a respective indication of a received signal strength;
 a respective indication of a signal-to-noise ratio;
 a respective identifier of a radio node.

When evaluating said similarity between the at least one current set of radio signal observation results and the at least one training set of radio signal observation results, in an exemplary embodiment, corresponding reduced sets may be taken into account which are reduced to those parameters of the current set of radio signal parameters and the training set of radio signal parameters for which an identifier of a radio node (e.g. a MAC address) is the same.

In other words, in an exemplary embodiment, the parameter representative of the similarity between the at least one current set of radio signal observation results and the at least one training set of radio signal observation results associated with the identification information of the area of interest is determined based on a reduced at least one current set of radio signal observation results and on a reduced at least one training set of radio signal observation results, wherein a respective reduced set of radio signal observation results is reduced to the radio signal observation results that are common to both the at least one current set of radio signal observation results and the at least one training set of radio signal observation results.

In this way, reduced sets of current radio signal observation results and training radio signal observation results may be provided, whereby the reduced sets may have a same length corresponding to a number of radio nodes from which corresponding radio signals have been observed. In other words, in an exemplary embodiment the at least one reduced training set of radio signal observation results and the at least one reduced current set of radio signal observation results respectively correspond to a sequence of radio signal parameters, e.g. representative of a received signal strength, of equal length, the equal length corresponding to a number of radio node identifiers included in a respective set of radio signal observation results and common to both the at least one current set of radio signal observation results and the at least one training set of radio signal observation results.

Based on such sets, sequences or vectors of radio signal observation results, which in an exemplary embodiment may in the reduced representation correspond to sets, collections, sequences or vectors of respective indications of a received signal strength (e.g. RSSI) may enable evaluating said similarity based on a corresponding metric. In other words, in an exemplary embodiment, the parameter representative of a similarity between the at least one training set of radio signal observation results and the at least one current set of radio signal observation results corresponds to a metric defined based on the at least one reduced training set of radio signal observation results and the at least one reduced current set of radio signal observation results.

Thus, in an exemplary embodiment, the parameter representative of a similarity between the at least one training set of radio signal observation results and the at least one current set of radio signal observation results corresponds to a Euclidian metric defined based on the at least one reduced training set of radio signal observation results and the at least one reduced current set of radio signal observation results. While a Euclidian metric turned out to provide a suitable balance between complexity and reliability, in particular distance metrics within the Squared L2 family, the L1 family and/or the Lp family may be used in addition or alternatively. Examples of metrics that may be used in addition or alternatively include:
 a Wasserstein or Earth mover's distance metric;
 a taxicab metric (also referred to as $L_1$ metric, Manhattan distance, city block distance);
 a Minkowski distance (also referred to as $L_p$ norm);
 a Hamming distance.

For example, the parameter representative of the similarity may correspond to a Euclidian metric defined based on the sequence of radio signal parameters corresponding to the reduced current set of radio signal observation parameters and based on the sequence of radio signal parameters corresponding to the reduced training set of radio signal observation parameters. For example, in an exemplary embodiment, if a corresponds to the sequence of radio signal parameters corresponding to the reduced training set of radio signal observation parameters, and if b corresponds to the sequence of radio signal parameters corresponding to the reduced current set of radio signal observation parameters, the parameter representative of a similarity is defined based on $$d(a, b) = \sqrt{\sum_{i=1}^{n}(a_i - b_i)^2}.$$

Thereby, n is the number of radio node identifiers included in a respective set of radio signal observation results and common to both the at least one current set of radio signal observation results and the at least one training set of radio signal observation results.

In an exemplary embodiment, the parameter representative of a similarity is defined including a normalization based on the number of the number of radio node identifiers included in a respective set of radio signal observation results and common to both the at least one current set of radio signal observation results and the at least one training set of radio signal observation results:

$$\text{distance} = \frac{\sqrt{\sum_{i=1}^{n}(a_{A,red,i} - b_{A,red,i})^2 + 1}}{c}.$$

In an exemplary embodiment, a respective set of radio signal observation results comprises for a corresponding observed radio signal a respective identifier of a radio node, wherein a parameter representative of common radio node identifiers corresponds to a number of respective identifiers of a radio node that are common to the at least one training set of radio signal observation results and the at least one current set of radio signal observation results, the method further comprising:
 determining whether the current tracking device is located within the area of interest based on the parameter representative of common radio node identifiers.

In other words, in an exemplary embodiment, the method may further comprise:

determining whether for at least one training set of radio signal observation results and for at least one current set of radio signal observations results, the parameter representative of common radio node identifiers is larger than a second threshold value.

In an exemplary embodiment, a respective set of radio signal observation results comprises for a corresponding observed radio signal a respective identifier of a radio node, wherein a parameter representative of non-common radio node identifiers corresponds to a number of respective identifiers of a radio node that are not common to the at least one training set of radio signal observation results and the at least one current set of radio signal observation results, the method further comprising:

determining whether the current tracking device is located within the area of interest based on the parameter representative of common radio node identifiers and based on the parameter representative of non-common radio node identifiers.

For example, the method may comprise in an exemplary embodiment:

determining whether for at least one training set of radio signal observation results and for at least one current set of radio signal observations results, a parameter macRatio representative of a ratio between the parameter commonMacAmount representative of common radio node identifiers to the parameter uncommonMacAmount representative of non-common radio node identifiers as macRatio=commonMacAmount/(uncommonMacAmount+1).

It is to be understood that the disclosure in this section is merely by way of examples and non-limiting.

Other features of the present disclosure will become apparent from the following detailed description considered in conjunction with the accompanying drawings. It is to be understood, however, that the drawings are designed solely for purposes of illustration and not as a definition of the limits of the present disclosure, for which reference should be made to the appended claims. It should be further understood that the drawings are not drawn to scale and that they are merely intended to conceptually illustrate the structures and procedures described herein.

BRIEF DESCRIPTION OF THE FIGURES

FIG. 8B is a flow chart illustrating an exemplary embodiment of a method according to an exemplary aspect;

DETAILED DESCRIPTION

The following description serves to deepen the understanding of the present disclosure and shall be understood to complement and be read together with the description as provided in the above SUMMARY section of this specification.

Figure 1:
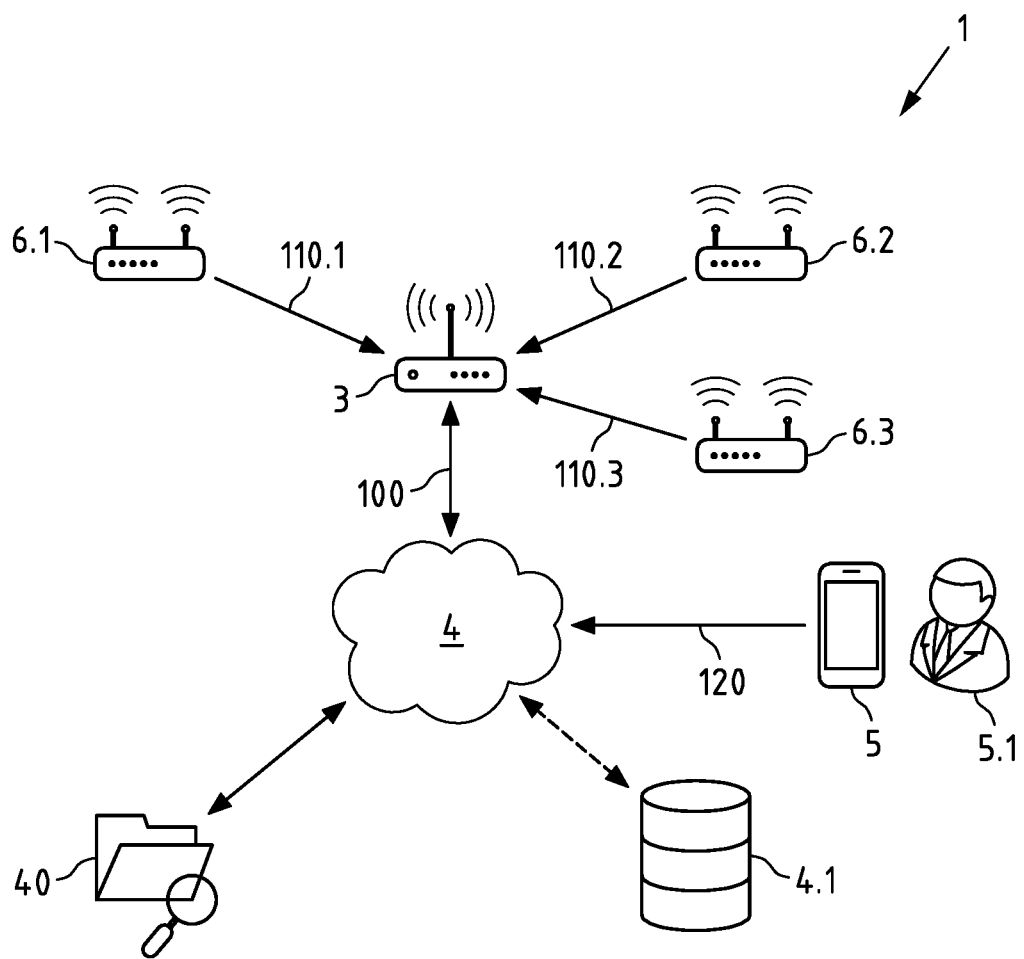
FIG. 1 is a block diagram of an exemplary embodiment of a system according to an exemplary aspect.

FIG. 1 is a schematic high-level block diagram of a system 1 according to an exemplary aspect. For exemplary purposes and without limiting the scope of the present disclosure, it is assumed in the following that a system 1 is or is part of a non-GNSS satellite signal based radio positioning system for a site.

The site is for example a predetermined indoor and/or urban environment like inside and/or outside of a building or a complex of buildings (e.g. a hospital, a shopping center, a parking garage, a train station, a bus station, an airport, a company site etc.). System 1 comprises a tracking device 3 and a server or cloud system 4 exemplarily represented in FIG. 1 cloud 4 and by server 4.1. While the following description refers to cloud 4 and/or to server 4.1, it is to be noted that the scope of the present disclosure is not limited to cloud 4 and server 4.1, but cloud 4 and server 4.1 may be replaced for example by a single sever, by more than one server, by a cloud and/or server system or by a combination thereof.

Tracking device 3 and cloud 4 and/or server 4.1 may communicate with each other via communication path 100. Communication path 100 may be a direct or indirect communication path. For example, communication path 100 may comprise one or more hops, for example, one or more communication links or communication connections. In the following, it is assumed that communication path 100 is a radio communication connection in a cellular network like a 2G/3G/4G/5G cellular communication network. The corresponding 2G/3G/4G/5G cellular radio communication standards are developed by the 3GPP and are presently available under http://www.3gpp.org/. Alternatively or in addition, communication path 100 may be or include a Wireless Local Area Network (WLAN) communication link, whereby WLAN is for example specified by the standards of the IEEE 802.11 family (http://www.iee.org/). Further, alternatively or in addition, communication path 100 may be or may include a Bluetooth communication link.

In an exemplary embodiment, tracking device 3 is a device configured for communication using communication path 100, i.e. is configured for communication using a cellular radio communication network, a WLAN communication network and/or a Bluetooth communication network. In the context of the present disclosure, tracking device 3 may correspond to a simple tracking device, such as a tracking tag, dedicated for the purpose of tracking only. In other words, while tracking device 3 may comprise simple control elements such as ON/OFF buttons or the like, in an exemplary embodiment, tracking device 3 does not comprise more complex functions such as for example more complex functions of a mobile device. While a more complex tracking device is not strictly required for the present disclosure, the present disclosure is at the same time also not limited in this respect. In other words, in a further exemplary embodiment, tracking device 3 is or is included in a mobile device. Thereby, a mobile device may be one of a smart phone, a tablet computer, a notebook computer, a smart watch, and a smart band.

Tracking device 3 is in an exemplary embodiment configured to collect data representative of its radio environment and to provide the collected data to cloud 4 and/or server 4.1 via communication path 100. To this end, tracking device 3 is configured to collect data such as radio signal observation data, the radio signal observation data representing at least on set of radio signal observation results captured by tracking device 3 at a respective observation position on the site. Thereby, a set of radio signal observation results captured at a respective observation position includes in an exemplary embodiment for a corresponding observed radio signal at least one of a respective indication of a received signal strength (e.g. RSSI), a respective indication of a signal-to-noise ratio (e.g. SNR, SINR) and/or a respective identifier of a radio node (for example a MAC address of the radio node). The set of radio signal observation results may include such parameters or one or more radio signals that are observable at the observation position from one or more corresponding radio nodes such as WLAN and/or Bluetooth radio nodes and/or notes of a cellular radio system.

For example, tracking device 3 may collect data based on radio signals transmitted/broadcasted by radio nodes 6.1, 6.2, 6.3 via respective communication paths 110.1, 110.2, 110.3. Thereby, radio nodes 6.1, 6.2, 6.3 may in an exemplary embodiment correspond to Wireless Local Area Network (WLAN) access points. In other words, in the situation exemplarily illustrated in FIG. 1, tracking device 3 is located at an observation position at which radio signals from a respective one of radio nodes 6.1, 6.2, 6.3 are observable, such that for a respective radio signal from a corresponding one of radio nodes 6.1, 6.2, 6.3 observed at this observation position, tracking device 3 may capture at least one of a respective indication of a received signal strength, a respective indication of a signal-two noise ratio, and/or a respective identifier of the respective one of radio nodes 6.1, 6.2, 6.3 (e.g. a respective MAC address).

In an exemplary embodiment, tracking device 3 is configured for providing radio signal observation data of tracking device 3 to cloud 4 and/or server 4.1 (e.g. to a cloud system, to a server and/or server system). Thereby, in an exemplary embodiment, said radio signal observation data representing at least one set of radio signal observation results captured by a radio interface of tracking device 3 when present on the site, wherein the at least one set of radio signal observation results is captured at a respective observation position on said site. While a single set of radio signal observation results may be sufficient for defining an area of interest (and to thus serve as training set of radio signal observation results) in accordance with certain aspects, and while a single current set of radio signal observation results may be sufficient for a determination of whether or not a tracking device has entered or is present within an area of interest in accordance with certain aspect, the present disclosure is not limited in this respect. Thus, in an exemplary embodiment, tracking device 3 may continuously provide radio signal observation data while moving along a path on said site, e.g. tracking device 3 may be configured for capturing respective sets of radio signal observation results at a sequence of corresponding observation positions along the track.

As further illustrated in FIG. 1, cloud 4 and/or server 4.1 may in an exemplary embodiment hold available radio signal observation data in form of a queue 40, whereby queue 40 may include radio signal observation data of one or more tracking devices, whereby radio signal observation data for a respective tracking device may correspond to one or more sequences of sets of radio signal observation results, whereby a respective set of radio signal observation results may respectively correspond to a corresponding observation position on the site.

Thereby, in an exemplary embodiment, the radio signal observation data of a tracking device is observable by including or being associated with identification information of the tracking device that has captured the radio signal observation data. In addition, in an exemplary embodiment, a respective set of radio signal observation results is further associated with corresponding timestamp data representing a respective capture time of the respective set of radio signal observation results, the capture time, for example, corresponding to a time at which the tracking device was located at the corresponding observation position. It is noted that a respective set of radio signal observation results may be discoverable in the queue 40 for at least 24 hours, while in certain situations, a set of radio signal observation results may be deleted after being in the queue 40 for 24 hours to ensure compliance with privacy regulations, e.g. GDPR requirements.

As further illustrated in FIG. 1, cloud 4 and/or server 4.1 may obtain setting information as disclosed further herein. In this connection, it is noted that a tracking device in accordance with exemplary embodiments of the present disclosure may be a simple device configured for obtaining and for providing sets of radio signal observation results having no further capabilities. In other words, a simple device may be sufficient for implementing methods according to exemplary aspects disclosed herein and complex functionalities implemented e.g. at a smartphone may not be required therefor.

For example, in the case illustrated in FIG. 1, tracking device 3 does not correspond to a user's mobile device but is a simpler tracking device such as a tracking tag or the like. While in this case, cloud 4 and/or server 4.1 may obtain current sets of radio signal observation results from tracking device 3, cloud 4 and/or server 4.1 may obtain setting information from a mobile device 5 of user 5.1 (an example of the external apparatus) via communication path 120. It is noted that communication path 120 may be a communication path in correspondence with communication path 100.

While FIG. 1 refers to mobile device 5 for illustrative purposes, it is to be noted that the present disclosure is not limited in this respect. For example, user 5.1 may likewise use a personal computer (a further example of the external apparatus) or a user interface connected to cloud 4 and/or server 4.1. In association with the setting information, cloud 4 and/or server 4.1 may obtain in addition also identification information of the area of interest, e.g. from mobile device 5 such as for example a name of the area of interest ("Room x"), information of the building in which the area of interest is located (e.g. a building address or a building name), information of a floor of a building on which the area of interest is located and/or geographical coordinates of the area of interest.

In this way, it becomes possible to define an area of interest for example only by at least one corresponding set of radio signal observation results characterizing a certain radio environment of a certain area of interest and further useful information such as a name of the area of interest without a requirement to define the area of interest in terms of geographical coordinates as it may be the case for known geofences.

While in an exemplary embodiment, the setting information is thus obtained from an external apparatus such as mobile device 5, it is noted that the present disclosure is not limited in this respect. As mentioned further herein, in an alternate example, tracking device 3 may correspond to a mobile device operated by a user. Once the user is present in certain area of interest, the user may for example use a user interface of the mobile device for causing setting information to be transmitted to cloud 4 and/or to server 4.1, the setting information indicating at least one set of radio signal observation results captured at a respective observation position on the site as at least one training set of radio signal observation results. The user may further use a corresponding application installed at the mobile device to transmit in association with the setting information additionally identification information of the area of interest.

Based on the obtained setting information, for example cloud 4 and/or server 4.1 may determine whether or not at least one set of radio signal observation results captured at a respective observation position on said site is indicated as training set of radio signal observation results by the setting information.

For example, the setting information may include tracking device identification information of a respective tracking device, for example of tracking device 3. Such tracking device identification information may correspond to user defined identification information, such as user defined name of a tracking device and/or a MAC address of a tracking device and/or information associated therewith.

The setting information may further indicate at least one capture time, for example the setting information may include information indicative of the at least one capture time. Thus, at least based on the capture time indicated by the setting information and optionally based on the tracking device identification information, cloud 4 may search queue 40 for determining whether at least one set of radio signal observation results is available that matches the setting information. For example, cloud 4 and/or server 4.1 may search for a set of radio signal observation results associated with timestamp data representing a respective capture time of the respective set of radio signal observation results, the captured time of which is equal to or later than the capture time indicated by the setting information.

In a further example, the setting information may further indicate at least two capture times representative of a capture time interval and cloud 4 and/or server 4.1 may search to queue 40 for one or more sets of radio signal observation results associated with timestamp data the capture time of which is equal to one of the at least capture time or is equal to one of the at least capture times indicated by the setting information or is within the capture time interval. If cloud 4 determines one or more corresponding sets of radio signal observation results to be available in queue 40, cloud 4 and/or server 4.1 may associate the one or more found sets of radio signal observation results as training sets with the identification information of an area of interest e.g. obtained from mobile device 5.

A user may thus identify one or more sets of radio signal observation results captured by one or more tracking devices as training sets for thus training a certain area of interest for example based on knowledge that within a certain time interval the one or more tracking devices where located within a certain are of interest and/or in the vicinity of a point of interest. For example based on knowledge that an item is to be delivered into a certain room (an example of an area of interest on a site such as a building) at a certain time, a user may provide corresponding setting information in association with identification information of the area of interest ("Room x of building y") to cloud 4 and/or server 4.1 which may identify one or more sets of radio signal observation results obtained from a tracking device attached to said item.

Figure 2:
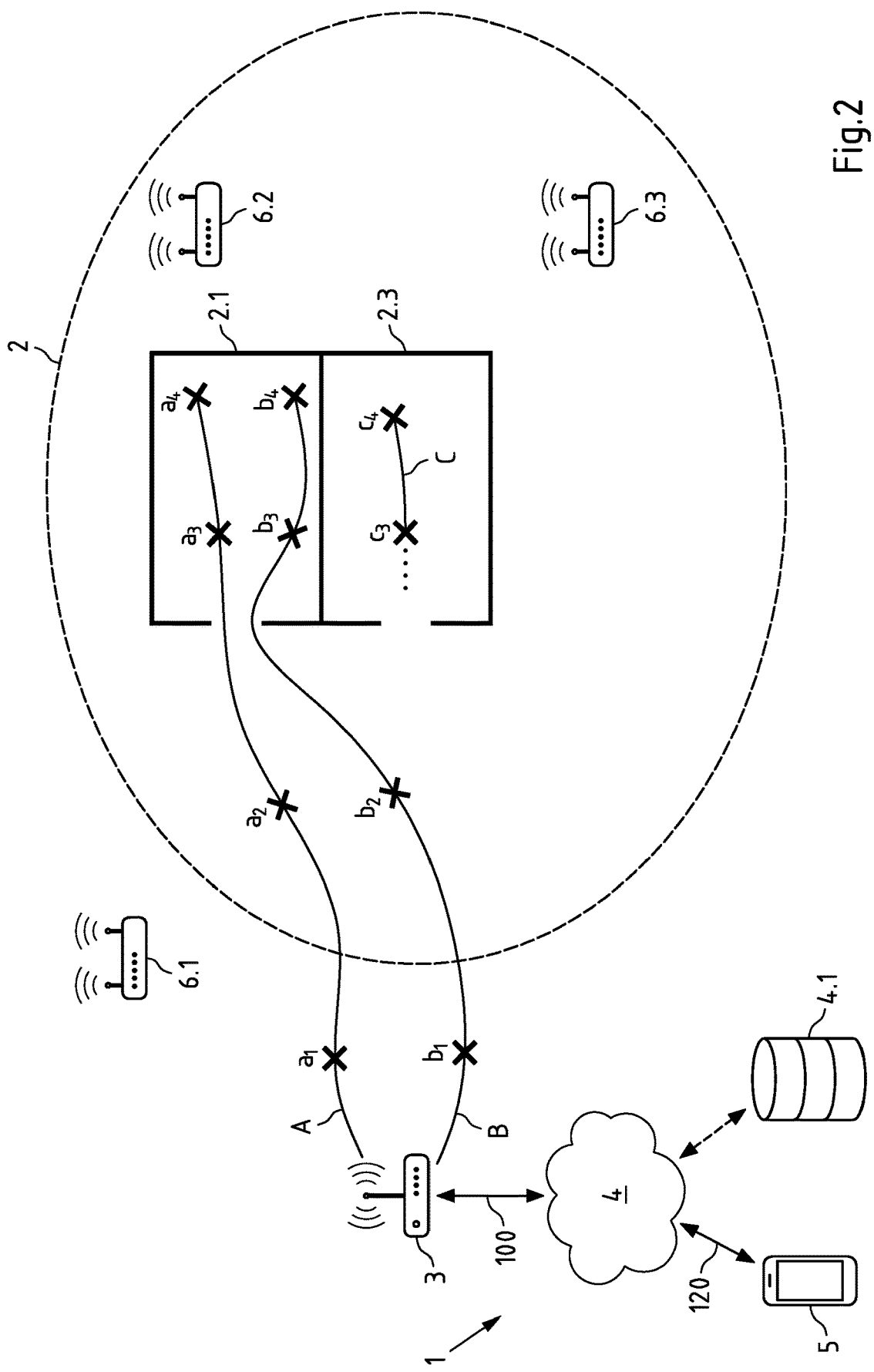
FIG. 2 is a block diagram of an exemplary embodiment of a system according to an exemplary aspect.

FIG. 2 exemplarily illustrates system 1 of FIG. 1 and site 2 including a first room 2.1 and a second room 2.3. For illustrative purposes, FIG. 2 shows path A with observation positions at which respective sets a1, a2, a3, a4 of radio signal observation signals are captured by tracking device 3 moving along said path A. As described further herein, a respective set of radio signal observation results, for example set a4, includes for a corresponding observed radio signal e.g. for a radio signal observed at the corresponding observation position for a radio signal observed at this observation position from a respective one of radio nodes 6.1 to 6.3, at least one of a respective indication of a received signal strength, e.g. a received signal strength indicator (RSSI) and a respective identifier of a radio node e.g. a MAC address. The set of radio signal observation results may further include an indication of a signal-to-noise ratio, e.g. an SNR parameter.

In the situation shown in FIG. 2, for example based on knowledge that tracking device 3 is located in room 2.1 within a particular time interval, for example using said external device, a user may provide cloud 4 and/or server 4.1 with setting information indicating said particular time interval in association with identification information of room 2.1 to thus train room 2.1 as an area of interest as described further herein. As a result, for example one or both sets a3 and a4 of radio signal observation results captured within room 2.1 may thus be identified as respective training sets of radio signal observation results for room 2.1 and may thus be associated with identification information (e.g. a name, floor information, building information, etc.) of room 2.1. For example, training sets a3 and a4 of radio signal observation results may be included into a corresponding database in association with such identification information, the database e.g. being held available at cloud 4 and/or server 4.1. FIG. 2 further indicates further training sets c3 and c4 of radio signal observation results captured within room 2.3 by tracking device 3 when moving along path C (only partly shown in the figure). Similarly, training sets c3 and c4 of radio signal observation results may be included into a corresponding database in association with identification information of room 2.3.

Once identification information of an area of interest is associated with one or more training sets indicated by setting information as described above, e.g. by being entered in a corresponding database held available at cloud 4 and/or server 4.1, the corresponding data can later be used to determine whether a tracking device, for example tracking device 3, has entered the area of interest. To this end, current radio signal observation data of the tracking device, e.g. of tracking device 3 which may correspond to radio signal observation data of tracking device 3 when moving along path B of FIG. 2 at a later point in time may be obtained.

FIG. 2 further illustrates path B along which tracking device 3 may move while capturing current sets b1, b2, b3, b4 of radio signal observation results and providing the same to cloud 4 and/or server 4.1. While tracking device 3 moves along said path B, cloud 4 and/or server 4.1 may determine whether the tracking device is within an area of interest, e.g. within room 2.1 based on said current sets b1, b2, b3, b4 of radio signal observation results and for example based on training sets a3 and a4 of radio signal observation results. For example, based on a similarity between sets a4 and b4 described further herein, it may be determined that having moved along path B, tracking device 3 has entered room 2.1.

Figure 3:
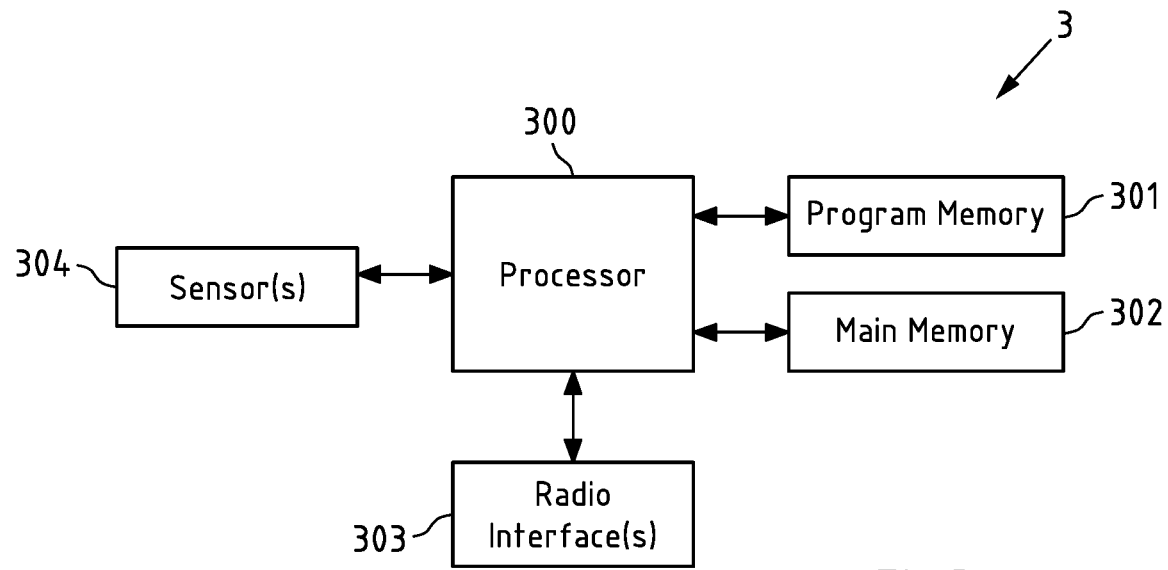
FIG. 3 is a block diagram of an exemplary embodiment of a tracking device according to an exemplary aspect.

FIG. 3 is a block diagram of an exemplary embodiment of tracking device 3 according to an exemplary aspect. In the following, it is assumed that tracking device 3 of FIGS. 1 and 2 corresponds to this tracking device 3. Tracking device 3 comprises a processor 300. Processor 300 may represent a single processor or two or more processors which are for example partially coupled for example via a bus. Processor 300 executes a computer program code start and program memory 301 (e.g. computer program code causing tracking device 3 to perform steps necessary for capturing radio signal observation results when present on a site and/or computer program code causing tracking device 3 to perform any one embodiment of the method of the exemplary aspect like the method described below with reference to FIG. 5 or as described below with reference to FIG. 7 when executed on processor 300), and interfaces with main memory 302. Program memory 301 may also contain an operating system for processor 300 and further data like radio signal observation data. Some or all of memories 301 and 302 may also be included into processor 300. One of or both of memories 301 and 302 may be flexibly connected to processor 300 or at least partially removable from processor 300, for example in the form of a memory card or stick.

A program memory (e.g. program memory 301) may for example be a non-volatile memory. It may for instance be a FLASH memory (or a part thereof), any of a ROM, PROM, EPROM, MRAM or a FeRAM (or a part thereof) or a hard disc (or a part thereof), to name but a few examples. For example, a program memory may for instance comprise a first memory section that is fixedly installed, and a second memory section that is removable, for instance in the form of a removable SD memory card.

A main memory (e.g. main memory 302) may for example be a volatile memory. It may for example be a DRAM memory, to give non-limiting example. It may for instance be used as a working memory for a processor (e.g. processor 300) when executing an operating system and/or programs.

Processor 300 further controls radio interface(s) 303. In the following, it is assumed that radio interface(s) 303 comprise a 2G/3G/4G/5G radio transceiver and a WLAN- and/or Bluetooth radio transceiver. It is however to be understood that the invention is not limited to this.

The 2G/3G/4G/5G radio transceiver of radio interface(s) 303 is configured and/or used for communicating via a cellular network, for example for transmitting and receiving data via communication path 100 of system 1. Accordingly, tracking device 3 may use the 2G/3G/4G/5G radio transceiver of radio interface(s) 303 to communicate with cloud 4 and/or server 4.1 of system 1.

The WLAN- and/or Bluetooth radio transceiver of radio interface(s) 303 is configured and/or used for capturing radio signal observation data. To this end, the WLAN- and/or Bluetooth radio transceiver may be configured or used for repeatedly scanning for WLAN and/or Bluetooth radio signals and for determining radio signal characteristics of observed WLAN and/or Bluetooth radio signals. A respective WLAN and/or Bluetooth radio signal may be understood to be observable if the respective WLAN and/or Bluetooth radio signal is receivable with a minimum quality (e.g. a minimum signal-to-noise ratio and/or a minimum signal power) by the WLAN- and/or Bluetooth radio transceiver of radio interface(s) 303.

Examples for radio signal characteristics of observed radio signals are an indication of a received signal strength of the observed radio signal and an identifier of a radio node transmitting the observed radio signal. Such radio signal characteristics may form part of corresponding radio signal observation results whereby a set of radio signal observation results may include one or more of such radio signal characteristics for one or more corresponding radio nodes.

In order to determine an indication of a received signal strength, the WLAN- and/or Bluetooth radio transceiver of radio interface(s) 303 may measure a receiving power of a radio signal observed by the tracking device 3 when scanning for radio signals. An example for an indication of a received signal strength is a received signal strength indicator (RSSI) or a physical receiving power level (e.g. a Rx power level) in dBm.

Moreover, the WLAN- and/or Bluetooth radio transceiver of radio interface(s) 303 may extract the identifier from an observed radio signal to determine an identifier of a radio node transmitting the radio signal. Examples for such an identifier of a radio node are a name, an address (e.g. a MAC address or an IP address), a universally unique identifier (UUID), a service set identifier (SSID), a basic service set identifier (BSSID), or a combination thereof.

Without limiting the scope of the present disclosure, it is assumed in the following that the radio signal observation data captured by the WLAN- and/or Bluetooth radio transceiver of radio interface(s) 303 represent a chronological sequence of sets of radio signal observation results, wherein each set of radio signal observation results includes a respective indication of a received signal strength and a respective identifier of a radio node for each WLAN and/or Bluetooth radio signals observed by the WLAN- and/or Bluetooth radio transceiver of radio interface(s) 303 at the same observation position (i.e. the position where the tracking device 3 is/was located when the respective set of radio signal observation results is/was captured).

It is to be understood that any computer program code required for receiving and processing observed radio signals may be stored in an own memory of radio interface(s) 303 and executed by an own processor of radio interface(s) 303 or it may be stored for example in program memory 301 and executed for example by processor 300.

Moreover, processor 300 controls sensor(s) 304 configured for capturing temperature, inertial, motion sensor data and/or position data. Thereby, sensors may include but are not limited to an accelerometer, a barometer, a gyroscope, a velocity sensor and/or a compass.

It is to be understood that any computer program code required for processing sensor captures to determine inertial and/or motion sensor data and reference position data may be stored in an own memory of sensor(s) 304 and executed by an own processor of sensor(s) 304 or it may be stored for example in program memory 301 and executed for example by processor 300.

The components 301 to 304 of tracking device 3 may for instance be connected with processor 300 by means of one or more serial and/or parallel busses.

It is to be understood that tracking device 3 may comprise various other components like a user interface for receiving user input.

Figure 4:
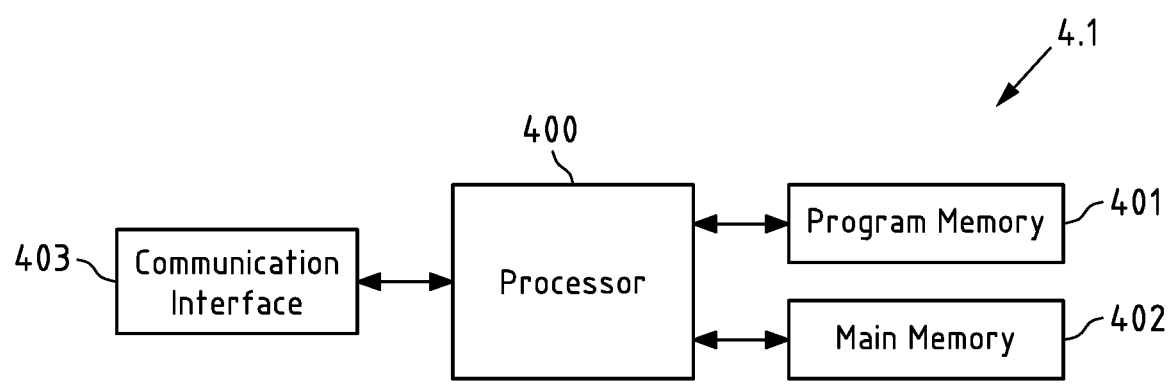
FIG. 4 is a block diagram of an exemplary embodiment of a server according to an exemplary aspect.

FIG. 4 is a block diagram of an exemplary embodiment of server 4.1 according to an exemplary aspect which may be understood as being representative of one or more servers of cloud 4 of FIGS. 1 and 2.

Server 4.1 comprises a processor 400. Processor 400 may represent a single processor or two or more processors, which are for instance at least partially coupled, for instance via a bus. Processor 400 executes a computer program code (e.g. computer program code causing server 4.1 to perform any one embodiment of the method of the exemplary aspect like the method described below with reference to FIG. 5 when executed on processor 400 and/or like the method described below with reference to FIG. 7 when executed on processor 400) stored in program memory 401, and interfaces with a main memory 402. Program memory 401 may also contain an operating system for processor 400. Moreover, program memory 401 may contain further data like data representative of identification information of one or more areas of interest and associated one or more training sets of radio signal observation results. Some or all of memories 401 and 402 may also be included into processor 400. One of or both of memories 401 and 402 may be fixedly connected to processor 400 or at least partially removable from processor 400, for example in the form of a memory card or stick.

Processor 400 further controls a communication interface 403 which is configured to communicate via a communication network. Server 4.1 may use communication interface 403 to communicate with tracking device 3 of system 1. In the following, it is assumed that communication interface 403 is a 2G/3G/4G/5G radio transceiver which is configured and/or used for communicating via a cellular network, for example for transmitting and receiving data via communication path 100 of system 1. Alternatively or in addition, communication interface 403 may be a radio transceiver which is configured and/or used for communicating via a WLAN and/or Bluetooth communication network.

The components 401 to 403 of server 4.1 may for example be connected with processor 400 by means of one or more serial and/or parallel busses.

It is to be understood that server 4.1 may comprise various other components like a user interface for receiving user input.

Figure 5:
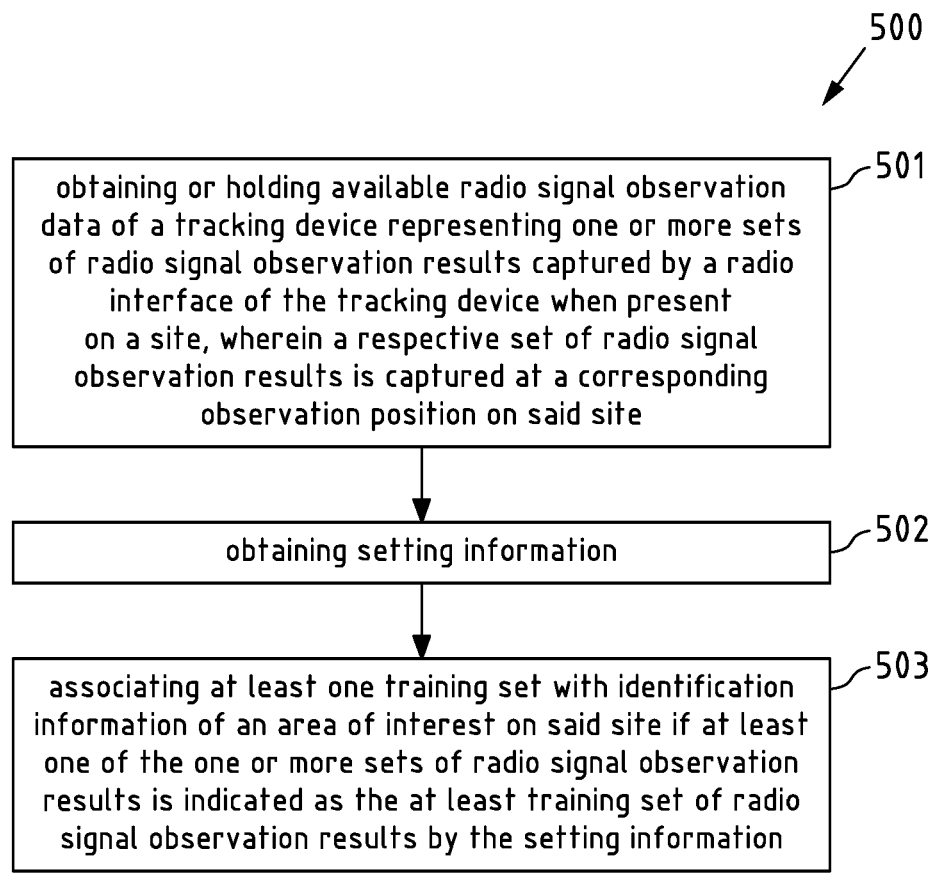
FIG. 5 is a flow chart illustrating an exemplary embodiment of a method according to an exemplary aspect.

FIG. 5 is a flow chart 500 illustrating an exemplary embodiment of a method. Without limiting the scope of the present disclosure, it is assumed in the following that server 4.1 as disclosed above with respect to system 1 of FIGS. 1 and 2 performs the steps of flow chart 500. It is noted that the present disclosure is, however, not limited in this respect. The steps of flowchart 500 can likewise be performed by tracking device 3 and/or an external apparatus such as mobile device 5 of FIGS. 1 and 2, or server 4.1, tracking device 3 or the external apparatus may cooperate to perform the steps of flowchart 500.

In a step 501, radio signal observation data of a tracking device is held available, the radio signal observation data representing one or more sets of radio signal observation results captured by a radio interface of the tracking device when present on a site, wherein a respective set of radio signal observation results is captured at a corresponding observation position on said site.

For example, as described above, in particular a simplistic tracking device 3, e.g. a tracking tag, as illustrated in FIGS. 1 and 3 that may be moved for example being attached to a certain item to be delivered e.g. into room 2.1. As further explained above, radio signal observation data may be held available for example in queue 40 to be used later in combination with setting information disclosed further herein.

In a step 502 setting information is obtained or held available.

As disclosed above, setting information may in particular be obtained from a remote apparatus such as mobile device 5 illustrated in FIG. 1. The setting information may in an exemplary embodiment be obtained in association with identification information of an area of interest to be trained by corresponding training sets of radio signal observation results captured by the tracking device.

In a step 503, at least one training set of radio signal observation results is associated with identification information of an area of interest on said site, if at least one of the one or more sets of radio signal observation results is indicated as the at least one training set of radio signal observation results by the setting information.

For example, a respective set of radio signal observation results may be associated with respective timestamp data representing a respective capture time of the respective set of radio signal observation results and the setting information may indicate at least one capture time. In this case, the at least one training set of radio signal observation results may be indicated as training set of radio signal observation results by the setting information based on the capture time indicated by the setting information and based on the capture time represented by timestamp data associated with the at least training set of radio signal observation results.

Figure 6:
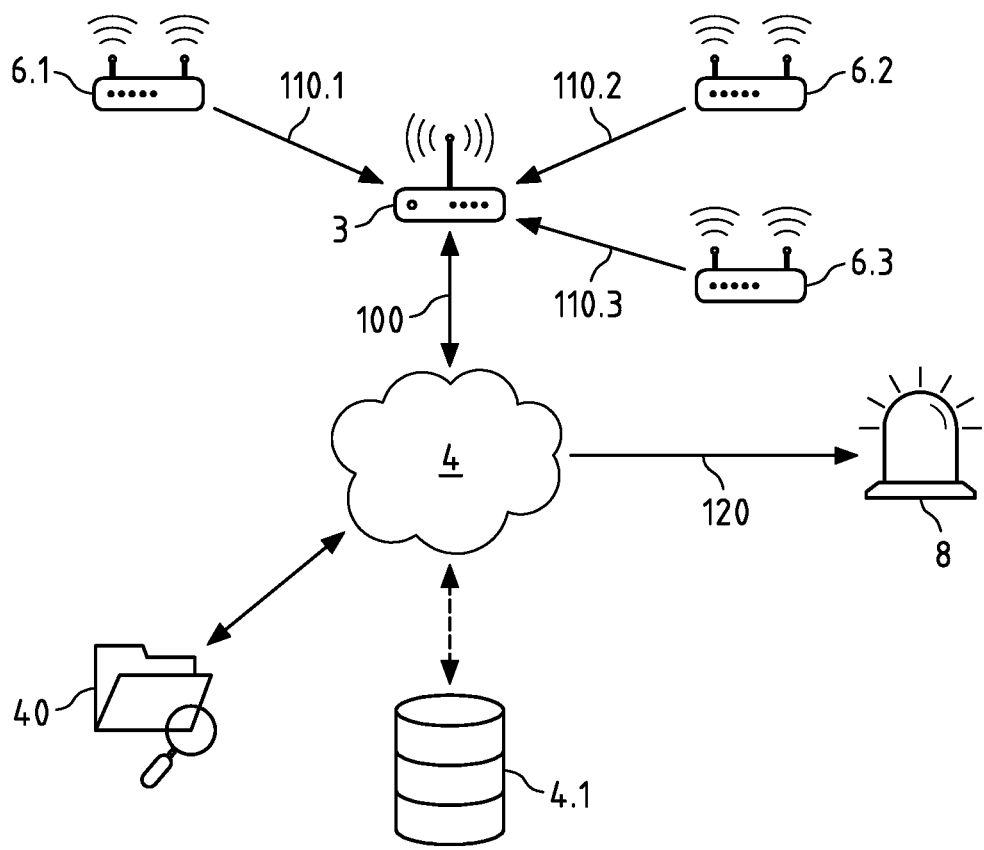
FIG. 6 is a block diagram of an exemplary embodiment of a system according to an exemplary aspect.

FIG. 6 shows system 1 of FIG. 1 in a situation of determining, whether tracking device has entered or is located in an area of interest. For example, tracking device 3 may provide one or more current sets of radio observation results, for example when present on one or more observation positions inside or outside of room 2.1 as illustrated in FIG. 2. In an exemplary embodiment, alternatively or in addition, tracking device 3 may continuously provide current sets of radio signal observation results to cloud 4 and/or server 4.1 while moving along path B via communication path 100 based on radio signals received from radio nodes 6.1, 6.2. 6.3 via communication paths 110.1, 110.2, 110.3 in accordance with a pre-defined schedule. Based on the correspondingly obtained current sets of radio signal observation results, for example cloud 4 and/or at server 4.1 may determine whether an obtained current set of radio signal observation results corresponds to or is similar to a training set of radio signal observation results included in queue 40 held available at cloud 4 and/or server 4.1.

Based at least thereon, i.e. if a current set of radio signal observation results is obtained which corresponds to or is similar to a training set of radio signal observation results included in queue 40, an alert 8 may be caused. For example, information may be provided to mobile device 5 shown in FIG. 1 via communication path 120 to cause a notification to be displayed to user 5.1. In this way, the area of interest is thus identified to system 1 in a similar manner as an area of interest could be identified using an existing geofence defined based on geographical coordinates. However, a definition of an area of interest in accordance with the present disclosure does not require such definition of geographical coordinates and can therefore more flexibly be applied to sites where e.g. GNSS reception may be non-existing or limited and/or where crowdsourcing is not possible or has not yet been performed.

Figure 7:
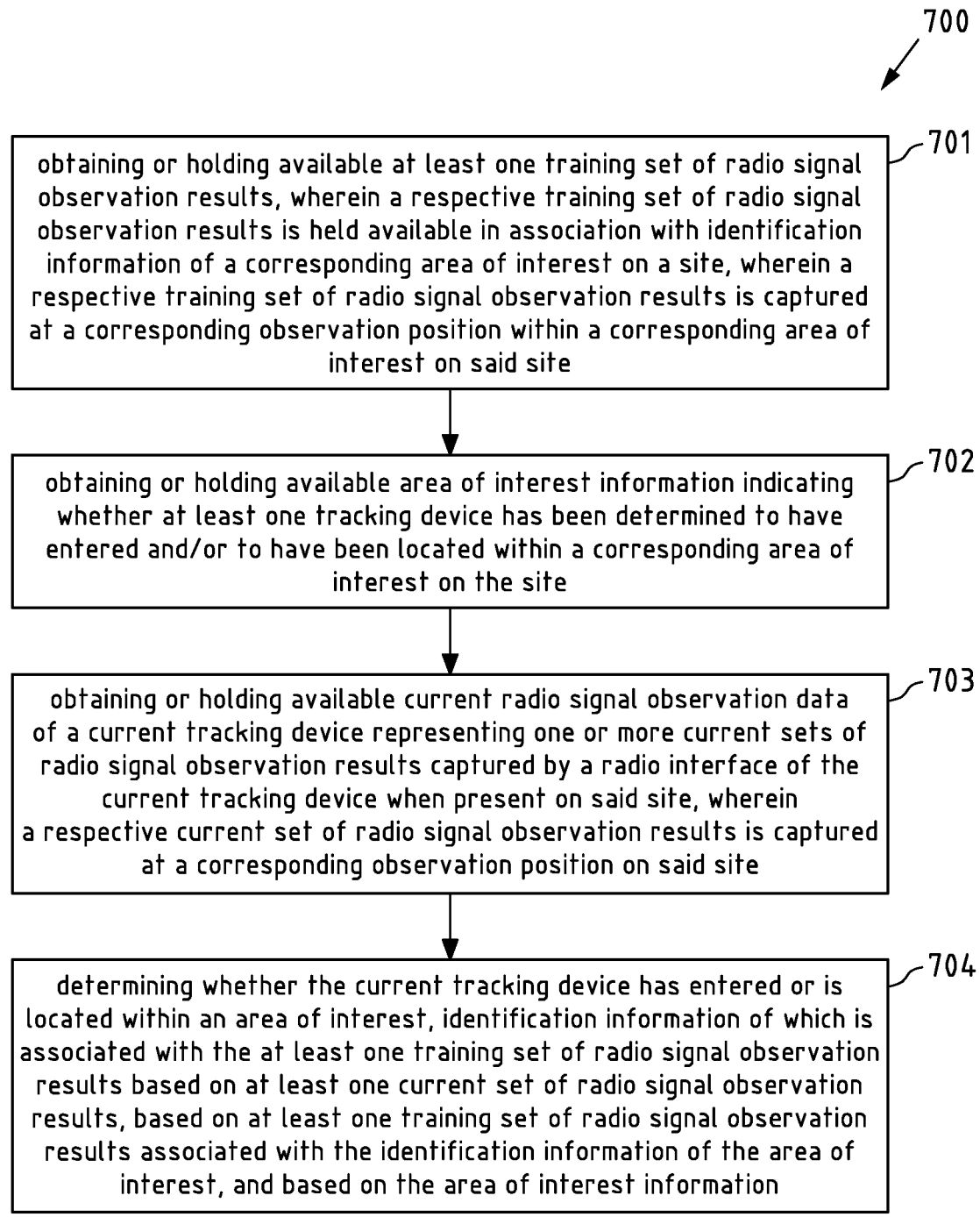
FIG. 7 is a flow chart illustrating an exemplary embodiment of a method according to an exemplary aspect.

FIG. 7 is a flow chart 700 illustrating an exemplary embodiment of a method according to an aspect of the present disclosure. Without limiting the scope of the present disclosure, it is assumed in the following that server 4.1 or cloud 4 as disclosed above with respect to system 1 of FIGS. 1, 2 and 6 performs the steps of flow chart 700. It is noted that the present disclosure is, however, not limited in this respect. The steps of flowchart 700 can likewise be performed by tracking device 3 and/or an external apparatus such as mobile device 5 of FIGS. 1 and 2, or server 4.1, tracking device 3 or the external apparatus may cooperate to perform the steps of flowchart 700.

In a step 701, at least one training set of radio signal observation results is obtained or held available, wherein a respective training set of radio signal observation results is held available in association with identification information of a corresponding area of interest on a site, wherein a respective training set of radio signal observation results is captured at a corresponding observation position within a corresponding area of interest on said site.

Thus, a training set of radio observation signals such as for example set a4 or set c4 of radio signal observation results shown in FIG. 2 may be held available in queue 40 of FIGS. 1 and 6 for example in association with identification information of room 2.1 or with room 2.3 of FIG. 2 as non-limiting examples of an area of interest. In case the steps of method 700 are performed by a mobile device (e.g. tracking device 3 and/or mobile device 5), such training data may similarly be held available at a corresponding database of the mobile device or may be obtained for example from cloud 4 and/or server 4.1.

In a step 702, area of interest information indicating whether at least one tracking device has been determined to have entered and/or to have been located within a corresponding area of interest on the site is obtained or held available.

Thus, a database, for example a database storing identification information of a certain areas of interest in association with corresponding training sets of radio signal observation results may in addition store area of interest information indicating that a tracking device has been determined already one or more times to have been within the area of interest.

In a step 703, current radio signal observation data of a current tracking device representing one or more current sets of radio signal observation results captured by a radio interface of the current tracking device when present on said site is obtained or held available, wherein a respective current set of radio signal observation results is captured at a corresponding observation position on said site.

Current radio signal observation data may for example include radio signal observation data representing sets of current radio signal observation results such as sets b1, b2, b3, b4 indicated along path B of FIG. 2.

In a step 704, it is determined whether the current tracking device has entered or is located within an area of interest, identification information of which is associated with the at least one training set of radio signal observation results, based on at least one current set of radio signal observation results, based on at least one training set of radio signal observation results associated with the identification information of the area of interest, and based on the area of interest information.

For example, if tracking device 3 shown in FIG. 2 that has captured training sets a1, a2, a3, a4 of FIG. 2 has not yet been determined itself to have been in room 2.1 for example based on training set a3 or training set a4, this may by indicated in corresponding area of interest information associated with room 2.1. If in this case, tracking device 3 provides for example current set b4 of radio signal observation results, it may erroneously be determined e.g. based on said current set b4 of radio signal observation results and e.g. based on training sets a4 and c4 from both rooms 2.1 and 2.3 that tracking device 3 is in room 2.3. While it is possible that this error may be corrected if tracking device 3 provides one or more further sets of radio signal observation results captured within room 2.1, undesirable oscillations may nevertheless occur when tracking device 3 comes close to a boundary between areas of interest such as to the wall between the rooms 2.1 and 2.3 in FIG. 2. In other words, tracking device 3 may undesirably be determined to be in room 2.1 in one area of interest determination and may be determined to be in room 2.3 in a further area of interest determination and so on, even though tracking device 3 may in fact be located in room 2.1.

Addressing this drawback of undesirable determination oscillations, the area of interest information is provided apply more weight to an area of interest in which a tracking device has been determined to be already before and in which the tracking device is therefore more likely to be located again. Namely, if the area of interest information subject to the determination in step 704 indicates that tracking device 3 has previously been determined to have been located in room 2.1, a current determination with an erroneous result that tracking device 3 is in room 2.3, for example based on the current set b4 may be corrected based on this area of interest information such that the determination yields that tracking device 3 is in fact in room 2.1 as is the case in FIG. 2. An example of a corresponding correction processing is disclosed in more detail below with reference to FIGS. 8A, 8B, 8C.

Figure 8A:
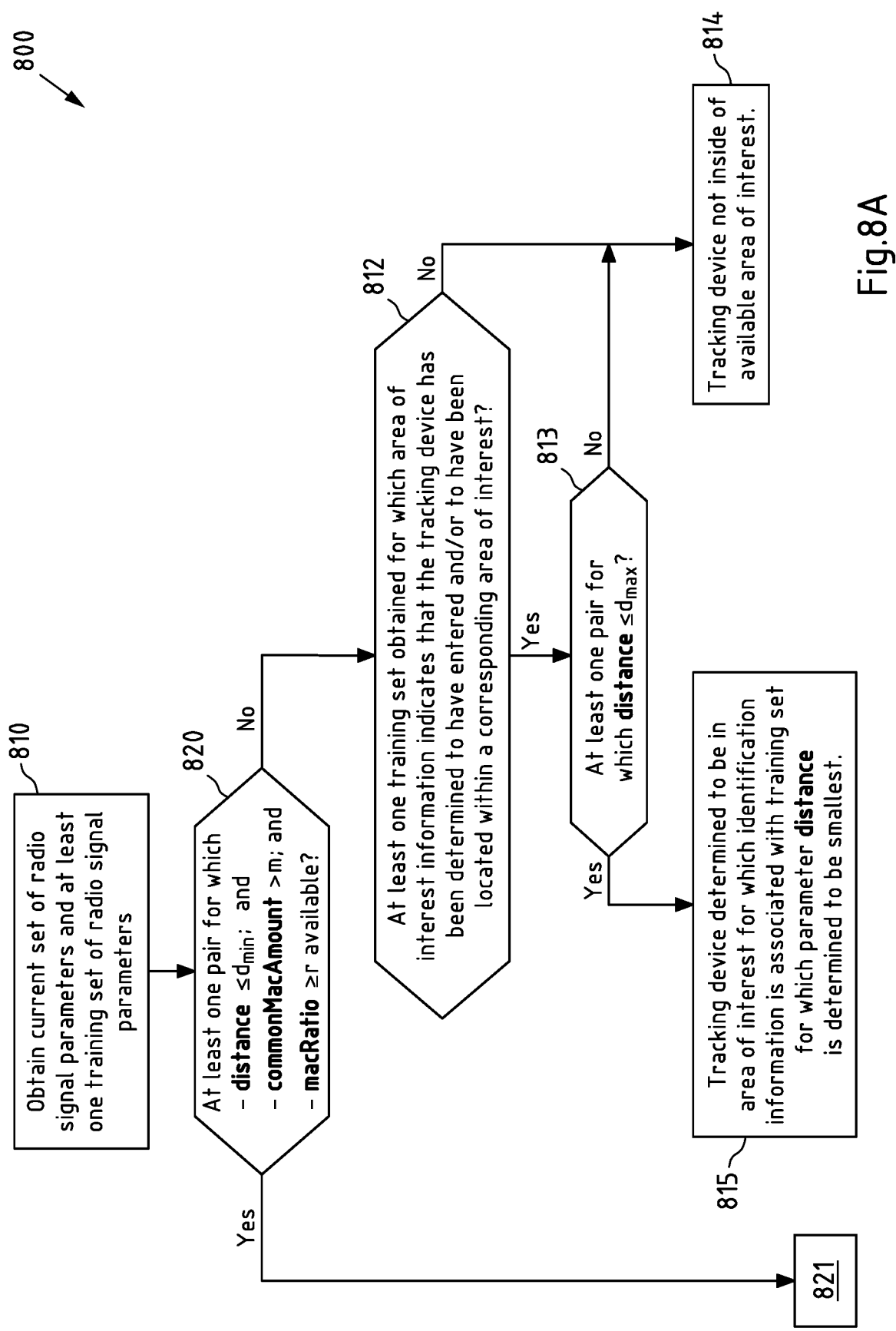
FIG. 8A is a flow chart illustrating an exemplary embodiment of a method according to an exemplary aspect.
Figure 8C:
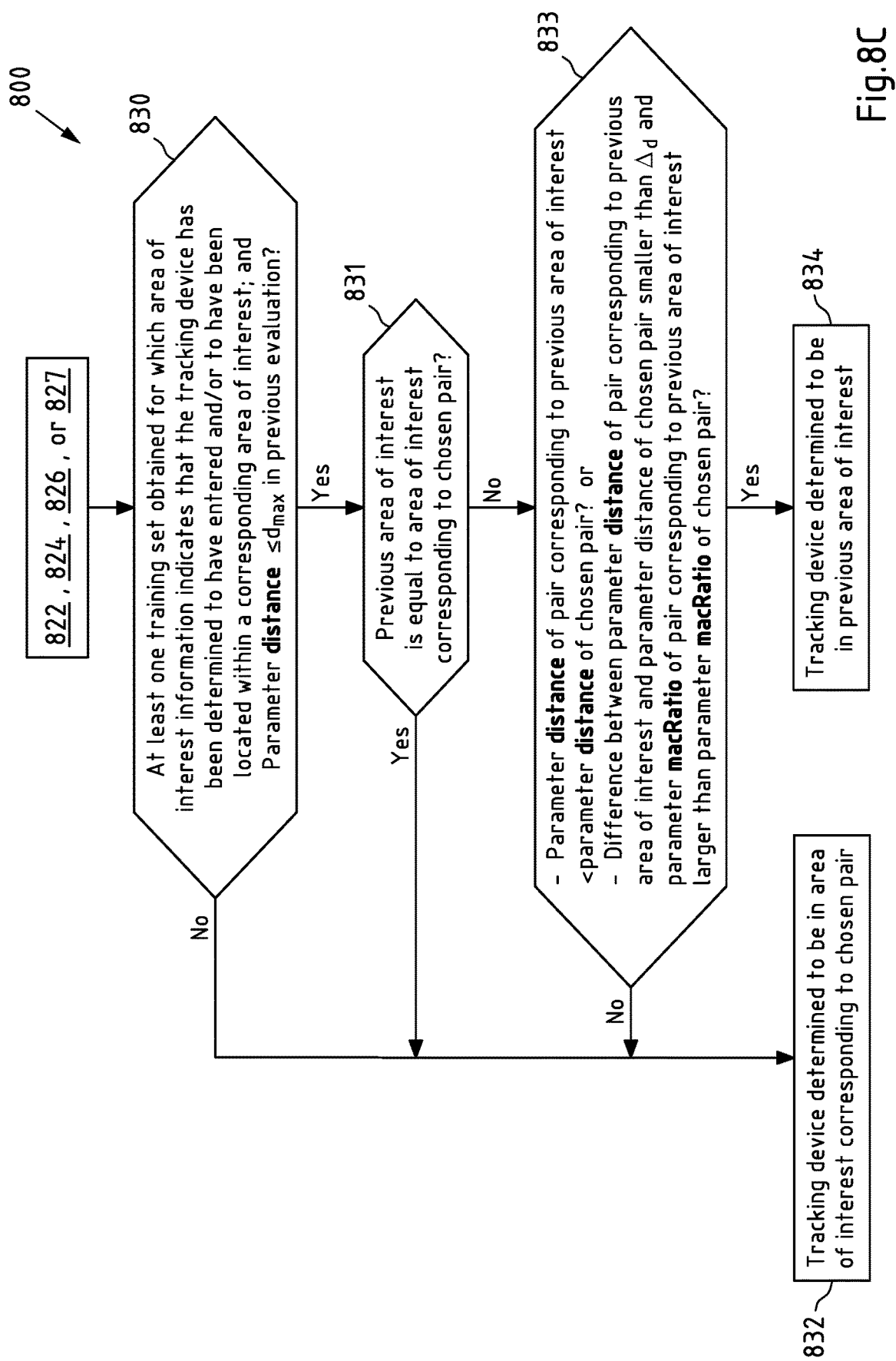
FIG. 8C is a flow chart illustrating an exemplary embodiment of a method according to an exemplary aspect and FIG. 9 is a schematic illustration of examples of tangible storage media according to exemplary aspects.

FIGS. 8A, 8B and 8C show a flow chart 800 illustrating an exemplary embodiment of a method according to the present disclosure. Without limiting the scope of the present disclosure, it is assumed in the following that server 4.1 as disclosed above with respect to system 1 of FIGS. 1, 2 and 6 performs the steps of flow chart 800. It is noted that the present disclosure is, however, not limited in this respect. The steps of flowchart 800 can likewise be performed by tracking device 3 and/or an external apparatus such as mobile device 5 of FIGS. 1 and 2, or server 4.1, tracking device 3 or the external apparatus may cooperate to perform the steps of flowchart 800.

First referring back to FIG. 2, tracking device 3 may provide for example current set b4 of radio signal observation results to cloud 4 and/or server 4.1 via communication path 100. Thereby, a respective set included in the sequence of sets b1, b2, b3, b4 of radio signal observation results may in a non-limiting example be represented in form of a current set or sequence of current pairs of radio signal parameters "ingestionScan". For example, set b4 may be represented as:

$$\text{ingestionScan}(b_4) = [\{mac\_b_{4,1}, RSS\_b_{4,1}\}, \{mac\_b_{4,2}, RSS\_b_{4,2}\}, \ldots, \{mac\_b_{4,N}, RSS\_b_{4,N}\}].$$

In other words, in a non-limiting illustrative example, a set of radio signal observation results may be represented as a sequence of value pairs, wherein each value pair includes a value representative of a respective identifier of a radio node (e.g. a MAC address, represented as "mac_b4,j") and a value representative of a respective indication of a received signal strength (e.g. RSSI, represented as "RSS_b4,j"), each value relating to a radio signal observed from a corresponding radio node (corresponding to the respective identifier of the radio node) at an observation position of the respective set. Following the example, N corresponds to a number of radio nodes (j=1 ... N) of which signals are observed at the observation position, in the exemplary case of set b4.

Further, training sets a3, a4 of radio signal observation results may have been collected based on radio signal measurements of tracking device 3. Continuing the non-limiting example, for example training set a4 of radio signal observation results may be represented by in form of a training set or sequence of training pairs of radio signal parameters "trainingScan":

$$\text{trainingScan} = [\{mac\_a_{4,1}, RSS\_a_{4,1}\}, \{mac\_a_{4,2}, RSS\_a_{4,2}\}, \ldots, \{mac\_a_{4,M}, RSS\_a_{4,M}\}]$$

Thereby, a radio signal parameter "mac_a4,$p$" corresponds to the MAC address of the M-th radio signal node for set a4 and a radio signal parameter "RSS_a4,$p$" corresponds to the RSSI of a radio signal observed from the M-th radio node (p=1 . . . M) for set a4.

Based thereon, representative parameters may be calculated as follows. Firstly, a first parameter representative of a number of identifiers of a radio node included both in the set or sequence of current pairs of radio signal parameters and in the set or sequence of training pairs of radio signal parameters (a "parameter representative of common radio node identifiers"), "commonMacAmount", can in a non-limiting example be defined as:

commonMacAmount: The number of MAC addresses common in ingestionScan and trainingScan.

Accordingly, a second parameter can be defined in correspondence as being a second parameter representative of a number of identifiers of a radio node not included in both of the set or sequence of current pairs of radio signal parameters and the set or sequence of training pairs of radio signal parameters, "unCommonMacAmount", as:

unCommonMacAmount: The number of MAC addresses not common in ingestionScan and trainingScan.

For this second parameter: uncommonMacAmount=N+M−2*commonMacAmount

A third parameter can be defined representing a ratio between the first and the second parameters:

macRatio: macRatio=commonMacAmount/(uncommonMacAmount+1)

Definition of such parameters may allow to define a metric for evaluating closeness or similarity between a current set (e.g. set b4) of radio signal observation results (a sequence of training pairs of radio signal parameters) and a training set (e.g. set a4 or set c4) of radio signal observation results (a sequence of training pairs of radio signal parameters). In a non-limiting example, a Euclidian metric ("Euclidian distance") may be defined as follows.

For a given pair of training set (e.g. for set a4) and current set (e.g. for set b4), a respective pair of reduced set or sequence a4,red of current radio signal parameters and reduced set or sequence b4,red of training radio signal parameters can be defined, a respective reduced set or sequence including only indication(s) of received signal strength (e.g. RSSI) for which a respective identifier of a radio node (e.g. MAC address) is common in both the training set and the current set. Thus, a4,red and b4,red may be represented as respective sets or sequences (or vectors) of received signal strength values of equal length n. Based thereon, for the exemplary reduced sets a4,red and b4,red, a Euclidian metric may be defined as:

$$d(a_{4,red}, b_{4,red}) = \sqrt{\sum_{i=1}^{n}(a_{4,red,i} - b_{4,red,i})^2}.$$

Based on this metric, a parameter "distance" representative of a similarity between the respective sets can be represented as a value normalized based on c= commonMacAmount as follows:

$$distance = \frac{\sqrt{\sum_{i=1}^{n}(a_{4,red,i} - b_{4,red,i})^2} + 1}{c}.$$

It is noted that the length n of the sets or sequences (or vectors) of received signal strength values may be equal to the parameter c=commonMacAmount such that equivalently:

$$distance = \frac{\sqrt{\sum_{i=1}^{c}(a_{4,red,i} - b_{4,red,i})^2} + 1}{c}.$$

As mentioned while a Euclidian metric turned out to provide a suitable balance between complexity and reliability, in particular distance metrics within the Squared L2 family, the L1 family and/or the Lp family may be used. Examples of metrics that may be used in addition or alternatively include:

a Wasserstein or Earth mover's distance metric;

a taxicab metric (also referred to as $L_1$ metric, Manhattan distance, city block distance);

a Minkowski distance (also referred to as $L_p$ norm);

a Hamming distance.

Exemplary application of the above defined parameters is exemplarily illustrated in the following with reference to FIGS. 8A-8C. Thereby, it is assumed that one or more areas of interest (e.g. rooms 2.1 and 2.3 in FIG. 2) are associated with tracking device 3, i.e. it is assumed that respective training sets have been collected by tracking device 3 and are held available e.g. in association with respective tracking device identification information in a database, e.g. at cloud 4 and/or server 4.1. For example, such database may hold available training sets a3 and a4 for room 2.1 and training sets c3 and c4 for room 2.3.

As shown in FIG. 8A, in a step 810, for example cloud 4 and/or server 4.1 obtains (e.g. receives via communication path 100) at least one current set of radio signal observation results (e.g. set b4) from tracking device 3. For example, cloud 4 and/or server 4.1 further obtains (e.g. retrieves from a corresponding database) at least one training set of radio signal observation results. For example, cloud 4 and/or server 4.1 may retrieve from such database training sets a4 and c4 respectively associated with identification information of room 2.1 and room 2.3 and each associated with tracking device 3. For example training set a4 may be associated with area of interest information indicating that tracking device 3 had already been determined to have entered and/or to have been located within room 2.1.

In a step 820, it is evaluated whether for example for one of the pairs of current set b4/training set a4 or current set b4/training set c4 obtained in step 810, a parameter representative of a similarity between a respective one of these sets, e.g. the parameter distance is smaller than or equal to a first threshold value dmin (which in the above example may have units of signal strength, e.g. dB). While the first threshold value dmin is a value larger than zero, in an exemplary embodiment, the first threshold value dmin is a value within a range of 0.1 to 10, in particular dmin=4±3.

In step 820, it is further evaluated whether the first parameter representative of a number of identifiers of a radio node included both in the sequence of current pairs of radio signal parameters and in the sequence of training pairs of radio signal parameters, commonMacAmount, is larger than a second threshold value m. While the second threshold value m is a value larger than zero, in an exemplary embodiment, the second threshold value m is a value within a range of 1 to 5.

In step 820, it is further evaluated whether the third parameter, macRatio, is larger than or equal to a third threshold value r. While the third threshold value r is a value larger than zero, in an exemplary embodiment, the third threshold value r is a value within a range of 0 to 1.

If for at least one pair, all of these criteria are met, method 800 proceeds to step 821 described below in the context of FIG. 8B. If no pair is found for which all of these criteria are met, method 800 proceeds to step 812, in which it is evaluated whether at least one training set is obtained in step 810 for which area of interest information indicates that the tracking device has been determined to have entered and/or to have been located within a corresponding area of interest (referred to as previous are of interest herein). To this end, for example cloud 4 and/or server 4.1 may obtain or hold available said area of interest information. Such area of interest information may for example be held available in the database in association with the identification information of an area of interest and/or in association with one or more corresponding training sets of radio signal observation results.

For example, it may be determined in step 812 that training set a4 may be associated with area of interest information indicating that tracking device 3 had already been determined to have entered and/or to have been located within room 2.1.

If the result of the evaluation in step 812 is negative, method 800 proceeds to step 814 and it is determined that tracking device 3 is not in any area of interest for which identification information is associated with a training set obtained in step 810.

If the result of the evaluation in step 812 is affirmative, method 800 proceeds to step 813 in which it is determined whether for at least one pair of current set of radio signal observation results and training set determined to be obtained in step 812 (e.g. for training set a4), the parameter distance is equal to or smaller than a fourth threshold value dmax. While in an exemplary embodiment, the fourth threshold value dmax is a value larger than the first threshold value dmin, in an exemplary embodiment, the fourth threshold value dmax is a value within a range of dmin to 15. A suitable value for the fourth threshold value turned out to be dmax=6.

In other words, if no training set exists for which in combination with a current set of radio signal observation parameters all criteria of step 820 are met, it is determined if for such training set corresponding to an area of interest in which the tracking device was previously determined to be present, the parameter distance is in combination with the current set of radio signal observation results below said fourth threshold value dmax.

Such previous determination may for example correspond to a previous determination in a current sequence of sets of radio signal observation results obtained along a path along which the tracking device may be presently moving (e.g. set b3 in FIG. 2 being previous to set b4 in sequence b1, b2, b3, b4) or may be based on a previous determination e.g. when tracking device 3 entered one of rooms 2.1 or 2.3 a previous time, e.g. on a previous day. For example, an evaluation may be defined to be a previous evaluation based on a time interval, e.g. in an exemplary embodiment, a parameter may be held available in association with area of interest information, with a training set of radio signal observation results and/or with identification information of an area of interest, the parameter indicating a point in time at which a tracking device was determined to have entered and/or to have been located within a corresponding area of interest. Alternatively or in addition, a determination may be defined to be a previous determination based on available location information of the tracking device, which may enable knowledge that tracking device 3 had previously entered room 2.1 or 2.3 or a building in which rooms 2.1 or 2.3 are located.

If the result of the evaluation in step 812 is affirmative, and if one or more previous determination results exist for which the parameter distance≤dmax, tracking device 3 may be determined to be in the area of interest identification information of which is associated with the training set included in the pair of current training set/training set determined to be obtained in step 812 for which the parameter distance is smallest.

Returning back to step 820, if for at least one pair, all of the criteria are met, method 800 proceeds to step 821 described in the context of FIG. 8B. As shown in FIG. 8B, in a step 821 it is determined whether for more than one pair of current set/training set obtained in step 810 (e.g. for current set b4/training set a4 and for the pair current set b4/training set c4), the parameter distance is smaller than or equal to a first threshold value dmin, e.g. smaller than or equal than 4. In the negative case, if only one pair is found, this pair is chosen in a step 822 and method 800 proceeds to step 830 in FIG. 8C.

If more than one pair is found in step 821, it is determined in step 823 whether for more than one pair obtained in step 810, e.g. for the pair current set b4/training set a4 and the pair current set b4/training set c4, the third parameter, macRatio, is larger than or equal to the third threshold value r, e.g. 0.2. In the negative case, if only one pair is found, this pair is chosen in a step 824 and method 800 proceeds to step 830 in FIG. 8C.

If more than one pair is found in step 823, it is determined in step 825 whether for more than one pair obtained in step 810, e.g. for the pair current set b4/training set a4 and for the pair current set b4/training set c4, the first parameter, commonMacAmount, is larger than the second threshold value m. In the negative case, if only one pair is found, this pair is chosen in a step 826 and method 800 proceeds to step 830 in FIG. 8C.

If more than one pair is found in step 825, it is thereby determined that multiple equally likely pairs exist. In this case, method 800 proceeds to step 827 and one of these multiple pairs is chosen for all of the criteria of step 820 are met. To this end, the method may choose among these multiple pair the pair with the smallest parameter distance, the smallest parameter macRatio, or the smallest parameter commonMacAmount. Based on the pair chose in step 827, method 800 then proceeds to step 830 in FIG. 8C.

As in case of steps 812 and 813, in step 830 it is similarly determined whether at least one training set is obtained in step 810 for which area of interest information indicates that the tracking device has been determined to have entered and/or to have been located within a corresponding area of interest. For example, it may be determined in step 830 that training set a4 may be associated with area of interest information indicating that tracking device 3 had already been determined to have entered and/or to have been located within room 2.1.

If no area of interest information is available for the tracking device and/or if for no training set obtained in step 810 area of interest information indicates that the tracking device has been determined to have entered and/or to have been located within any area of interest, method 800 proceeds to step 832 and it is determined that the tracking device has entered or is located in the area of interest for which identification information is associated with the training set of the pair chosen in any one of steps 822, 824, 826 or 827.

In the affirmative case, if area of interest information indicates that the tracking device has been determined to have entered and/or to have been located within at least one previous area of interest, it is determined in step 830 whether for at least one pair of current set of radio signal observation results/training set associated with the at least one previous area of interest, the parameter distance is equal to or smaller than the fourth threshold value dmax. If this is not the case of any previous area of interest, method 800 again proceeds to step 832.

If for one or more pairs found in step 830, the parameter distance is equal to or smaller than the fourth threshold, method 800 proceeds to step 831 based on the single pair found in step 830 or based on the pair found in step 830 for which the parameter distance is smallest. Thereby, an area of interest associated with a training set of the single pair or of the pair found in step 830 for which the parameter distance is smallest is understood to be the area of interest in which the tracking device had been determined to be located the previous time, and is referred to herein as previous area of interest.

In step 831, it is then determined whether said previous area of interest corresponds to the area of interest for which identification information is associated with the training set of the pair chosen in any one of steps 822, 824, 826 or 827. In the affirmative case, method 800 likewise proceeds to step 832 and it is determined in step 832 that tracking device 3 has entered or is located in the area of interest for which identification information is associated with the training set of the pair chosen in any one of steps 822, 824, 826 or 827.

If it is determined in step 831 that the previous area of interest does not correspond to the area of interest for which identification information is associated with the training set of the pair chosen in any one of steps 822, 824, 826 or 827, method 800 proceeds to step 833.

In step 833, it is determined whether the parameter distance of the pair corresponding to the previous area of interest, i.e. the pair current set of radio signal observation results/training pair of radio signal observation results associated with identification information of the previous area of interest is smaller than the parameter distance of the pair chosen in any one of steps 822, 824, 826 or 827. In the affirmative case, tracking device 3 is determined to be in the previous area of interest.

In the negative case or alternatively, it is determined whether the difference between the parameter distance of the pair corresponding to the previous area of interest and the parameter distance of the pair chosen in any one of steps 822, 824, 826 or 827 is smaller than a fifth threshold value Δd (for example 1.5) and it is determined whether the parameter macRatio of the pair corresponding to the previous area of interest is larger than the parameter macRatio of the pair chosen in any one of steps 822, 824, 826 or 827.

If at least one of the criteria of step 833 is met, method 800 proceeds to step 834 in which it is determined that tracking device 3 is in the previous area of interest. If both criteria of step 833 are not met, method 800 proceeds to step 832 and it is determined that the tracking device has entered or is located in the area of interest for which identification information is associated with the training set of the pair chosen in any one of steps 822, 824, 826 or 827.

Thus, by providing the area of interest information employed e.g. in steps 812 and 830 of method 800, it thus becomes possible to avoid undesirable oscillations in determining a tracking device to be in an area of interest, e.g. if a tracking device is close to a boundary between areas of interest.

Figure 9:
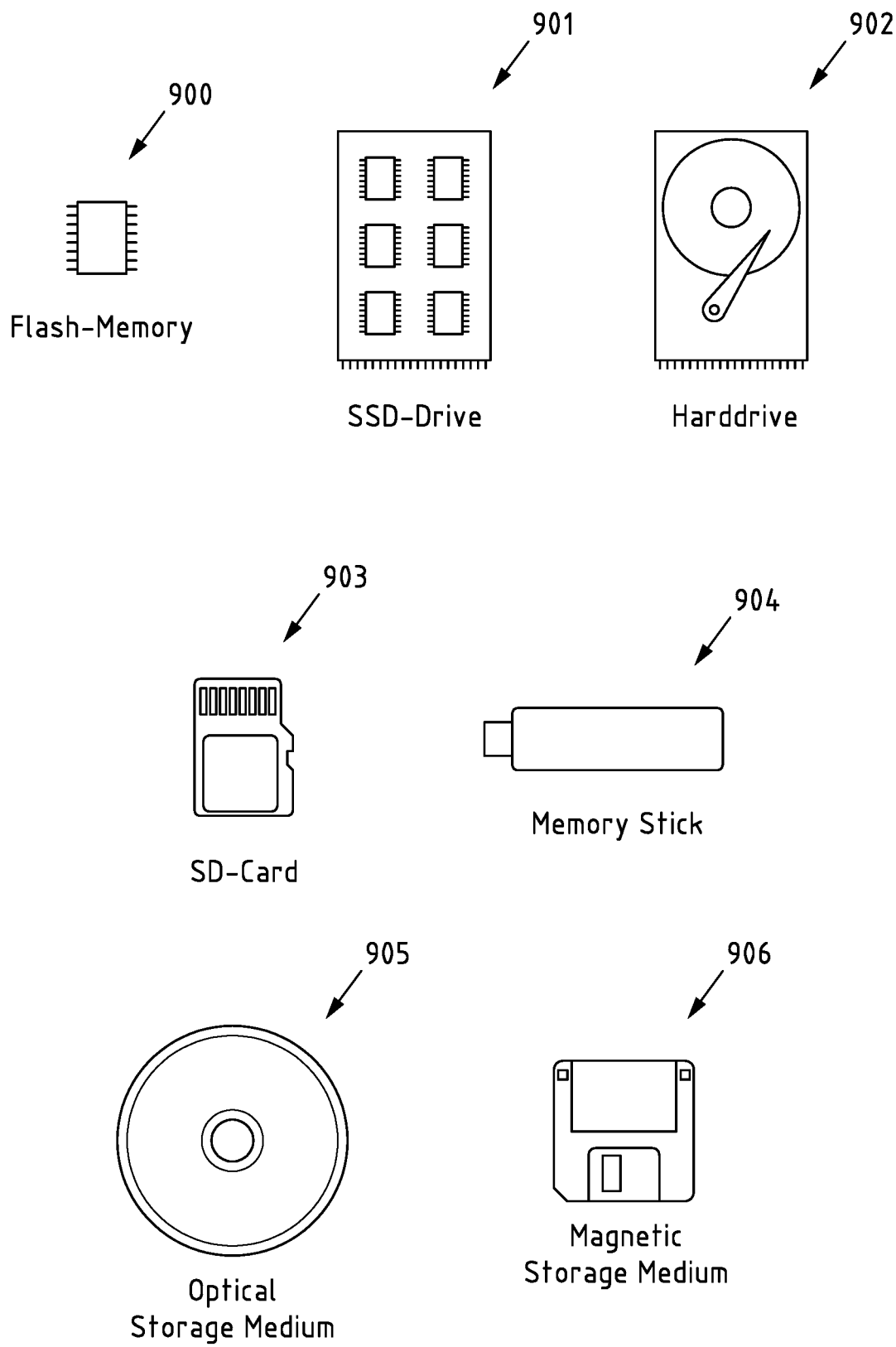

FIG. 9 is a schematic illustration of examples of tangible and non-transitory computer-readable storage media according to the aspects that may for instance be used to implement memory 301 of FIG. 3 or 401 of FIG. 4. To this end, FIG. 9 displays a flash memory 900, which may for instance be soldered or bonded to a printed circuit board, a solid-state drive 901 comprising a plurality of memory chips (e.g. Flash memory chips), a magnetic hard drive 902, a Secure Digital (SD) card 903, a Universal Serial Bus (USB) memory stick 904, an optical storage medium 905 (such as for instance a CD-ROM or DVD) and a magnetic storage medium 906.

The following embodiments of the disclosure are also disclosed:

Embodiment 1

A method comprising:
obtaining or holding available radio signal observation data of a tracking device representing one or more sets of radio signal observation results captured by a radio interface of the tracking device when present on a site, wherein a respective set of radio signal observation results is captured at a corresponding observation position on said site;
obtaining or holding available setting information;
associating at least one training set of radio signal observation results with identification information of an area of interest on said site, if at least one of the one or more sets of radio signal observation results is indicated as the at least one training set of radio signal observation results by the setting information.

Embodiment 2

The method according to embodiment 1, wherein a respective set of radio signal observation results is associated with respective time stamp data representing a respective capture time of the respective set of radio signal observation results, and wherein the setting information indicates at least one capture time, the method further comprising:
determining the at least one training set of radio signal observation results to be indicated as training set of radio signal observation results by the setting information based on the capture time indicated by the setting information and based on the capture time represented by time stamp data associated with the at least one training set of radio signal observation results.

Embodiment 3

The method according to embodiment 2, wherein the at least one training set of radio signal observation results is determined to be indicated by the setting information as training set of radio signal observation results if the capture time represented by the time stamp data associated with the training set of radio signal observation results is equal to or later than the capture time indicated by the setting information.

Embodiment 4

The method according to embodiment 2, wherein the setting information indicates at least two capture times representative of a capture time interval, or indicates the capture time interval, the method further comprising:
  determining the at least one training set of radio signal observation results to be indicated by the setting information as training set of radio signal observation results if the capture time represented by the time stamp data associated with the training set of radio signal observation results is equal to one of the at least two capture times or is within the capture time interval.

Embodiment 5

The method according to any of embodiments 1 to 4, wherein the obtaining or holding available the radio signal observation data comprises obtaining or holding available radio signal observation data of at least two tracking devices, and wherein the setting information includes tracking device identification information, the method further comprising:
  determining whether tracking device identification information included in the setting information corresponds to tracking device identification information of a respective one of the at least two tracking devices; and
  associating said at least one training set of radio signal observation results with said identification information identifying the area of interest on said site if the tracking device identification information included in the setting information is determined to correspond to tracking device identification information of a respective one of the at least two tracking devices.

Embodiment 6

The method according to any of embodiments 1 to 5, wherein the obtaining or holding available the radio signal observation data comprises obtaining or holding available respective radio signal observation data of at least two corresponding tracking devices, wherein respective radio signal observation data represent for a corresponding tracking device respective sets of radio signal observation results, wherein a respective set of radio signal observation results is captured by a radio interface of a corresponding tracking device when present on the site, the respective set of radio signal observation results being captured at a corresponding observation position on said track.

Embodiment 7

The method according to any of embodiments 1 to 6, wherein radio signal observation data represent a sequence of sets of radio signal observation results captured by a radio interface of a corresponding tracking device at two or more subsequent observation positions.

Embodiment 8

The method according to any of embodiments 1 to 7, further comprising:
  obtaining the identification information of the area of interest, wherein the identification information of the area of interest comprises at least one of:
  a name of the area of interest;
  information of a building in which the area of interest is located;
  information of a floor of a building on which the area of interest is located;
  geographical coordinates of the area of interest.

Embodiment 9

The method according to any of embodiments 1 to 8, wherein a respective set of radio signal observation results comprises for a corresponding observed radio signal at least one of:
  a respective indication of a received signal strength;
  a respective indication of a signal-to-noise ratio;
  a respective identifier of a radio node.

Embodiment 10

The method according to any of embodiments 1 to 9, further comprising:
  obtaining or holding available sensor data of a tracking device captured by one or more sensors of the tracking device when present on said site; wherein the sensor data are at least one of:
  temperature sensor data;
  inertial sensor data;
  motion sensor data,
  barometer sensor data;
  altimeter data.

Embodiment 11

The method according to any of embodiments 1 to 10, wherein said site is at least partially inside a building or a complex of buildings.

Embodiment 12

The method according to any of embodiments 1 to 11, further comprising:
  obtaining or holding available current radio signal observation data of a tracking device representing at least one current set of radio signal observation results captured by a radio interface of the current tracking device when present on said site, wherein a respective current set of radio signal observation results is captured at a corresponding observation position on said site;
  determining whether the tracking device has entered or is located within an area of interest identification information of which is associated with the at least one training set of radio signal observation results based on at least one current set of radio signal observation results and based on the at least one training set of radio signal observation results;
  providing notification information or causing an alert if it is determined that the tracking device is within the area of interest.

Embodiment 13

The method according to any of embodiments 1 to 11, further comprising:
  obtaining or holding available at least one training set of radio signal observation results, wherein a respective training set of radio signal observation results is held available in association with identification information of a corresponding area of interest on a site, wherein a respective training set of radio signal observation results is captured at a corresponding observation position within a corresponding area of interest on said site;

obtaining or holding available area of interest information indicating whether at least one tracking device has been determined to have entered and/or to have been located within a corresponding area of interest on the site;

obtaining or holding available current radio signal observation data of a current tracking device representing one or more current sets of radio signal observation results captured by a radio interface of the current tracking device when present on said site, wherein a respective current set of radio signal observation results is captured at a corresponding observation position on said site;

determining whether the current tracking device has entered or is located within an area of interest identification information of which is associated with the at least one training set of radio signal observation results based on at least one current set of radio signal observation results, based on at least one training set of radio signal observation results associated with the identification information of the area of interest, and based on the area of interest information.

Embodiment 14

The method according to any of embodiments 1 to 13 being performed by at least one apparatus.

Embodiment 15

A computer program code, said computer program code when executed by a processor causing an apparatus to perform the method according to any of embodiments 1 to 14.

Embodiment 16

An apparatus, said apparatus comprising means for performing the method according to any of embodiments 1 to 14.

Embodiment 17

A positioning system comprising one or more tracking devices and an apparatus according to embodiment 16.

Embodiment 18

A non-transitory computer readable storage medium in which computer program code is stored, said computer program code when executed by a processor causing at least one apparatus to perform the method according to any of embodiments 1 to 14.

Embodiment 19

An apparatus, said apparatus comprising at least one processor and at least one memory including computer program code, said at least one memory and said computer program code configured to, with said at least one processor, cause said apparatus at least to perform the method according to any of embodiments 1 to 14.

Embodiment 20

A method comprising:
obtaining or holding available at least one training set of radio signal observation results, wherein a respective training set of radio signal observation results is held available in association with identification information of a corresponding area of interest on a site, wherein a respective training set of radio signal observation results is captured at a corresponding observation position within a corresponding area of interest on said site;

obtaining or holding available area of interest information indicating whether at least one tracking device has been determined to have entered and/or to have been located within a corresponding area of interest on the site;

obtaining or holding available current radio signal observation data of a current tracking device representing one or more current sets of radio signal observation results captured by a radio interface of the current tracking device when present on said site, wherein a respective current set of radio signal observation results is captured at a corresponding observation position on said site;

determining whether the current tracking device has entered or is located within an area of interest, identification information of which is associated with the at least one training set of radio signal observation results, based on at least one current set of radio signal observation results, based on at least one training set of radio signal observation results associated with the identification information of the area of interest, and based on the area of interest information.

Embodiment 21

The method according to embodiment 20, if it is determined based on the at least one training set of radio signal observation results and the at least one current set of radio signal observation results that the current tracking device has entered or is located within an area of interest, identification information of which is associated with the at least one training set of radio signal observation results, the method further comprising: determining whether the current tracking device has previously entered or was previously located within the same area of interest, the method further comprising at least one of:
if it is determined that the current tracking device has previously entered or was previously located within the same area of interest, determining that the current tracking device has entered or is located within the same area of interest;
if it is determined that the current tracking device has previously entered or was previously located within a different area of interest, determining that the current tracking device has entered or is located within the different area of interest.

Embodiment 22

The method according to embodiment 21, further comprising at least one of:
if it is determined that the current tracking device has previously entered or was previously located within the same area of interest, providing notification information and/or or causing an alert indicating that the current tracking device is within the same area of interest;
if it is determined that the current tracking device has previously entered or was previously located within a different area of interest, providing notification information and/or or causing an alert indicating that the current tracking device is within the different area of interest.

Embodiment 23

The method according to any of embodiments 20 to 22, wherein the area of interest information is associated with one or more areas of interest and indicates whether at least one tracking device has been determined to have entered and/or to have been located within at least one of the one or more areas associated with the one or more areas of interest associated with the area of interest information;
if it is determined that the current tracking device has not previously entered an area of interest associated with the area of interest information or was previously located within an area of interest associated with the area of interest information, determining that the current tracking device has entered or is located within the area of interest, identification information of which is associated with the at least one training set of radio signal observation results.

Embodiment 24

The method according to embodiment 23, further comprising:
if it is determined that the current tracking device has not previously entered an area of interest associated with the area of interest information or was previously located within an area of interest associated with the area of interest information, providing notification information and/or or causing an alert indicating that the current tracking device has entered or is located within the area of interest, identification information of which is associated with the at least one training set of radio signal observation results.

Embodiment 25

The method according to any of embodiments 20 to 24, wherein determining whether the current tracking device is located within the area of interest is based on a parameter representative of a similarity between the at least one current set of radio signal observation results and the at least one training set of radio signal observation results associated with the identification information of the area of interest.

Embodiment 26

The method according to embodiment 25, wherein the parameter representative of the similarity between the at least one current set of radio signal observation results and the at least one training set of radio signal observation results associated with the identification information of the area of interest is determined based on a reduced at least one current set of radio signal observation results and on a reduced at least one training set of radio signal observation results, wherein a respective reduced set of radio signal observation results is reduced to the radio signal observation results that are common to both the at least one current set of radio signal observation results and the at least one training set of radio signal observation results.

Embodiment 27

The method according to any of embodiments 25 or 26, wherein the parameter representative of a similarity between the at least one training set of radio signal observation results and the at least one current set of radio signal observation results corresponds to a metric defined based on the at least one reduced training set of radio signal observation results and the at least one reduced current set of radio signal observation results.

Embodiment 28

The method according to any of embodiments 20 to 27, wherein a respective set of radio signal observation results comprises for a corresponding observed radio signal a respective identifier of a radio node, and wherein a parameter representative of common radio node identifiers corresponds to a number of respective identifiers of a radio node that are common to the at least one training set of radio signal observation results and the at least one current set of radio signal observation results, the method further comprising:
determining whether the current tracking device is located within the area of interest based on the parameter representative of common radio node identifiers.

Embodiment 29

The method according to any of embodiments 20 to 28, wherein a respective set of radio signal observation results comprises for a corresponding observed radio signal a respective identifier of a radio node, and wherein a parameter representative of non-common radio node identifiers corresponds to a number of respective identifiers of a radio node that are not common to the at least one training set of radio signal observation results and the at least one current set of radio signal observation results, the method further comprising:
determining whether the current tracking device is located within the area of interest based on the parameter representative of common radio node identifiers and based on the parameter representative of non-common radio node identifiers.

Embodiment 30

The method according to any of embodiments 20 to 29, wherein a respective set of radio signal observation results comprises for a corresponding observed radio signal at least one of:
a respective indication of a received signal strength;
a respective indication of a signal-to-noise ratio;
a respective identifier of a radio node.

Embodiment 31

The method according to any of embodiments 1 to 30 being performed by at least one apparatus.

Embodiment 32

A computer program code, said computer program code when executed by a processor causing an apparatus to perform the method according to any of embodiments 20 to 31.

Embodiment 33

An apparatus, said apparatus comprising means for performing the method according to any of embodiments 20 to 31.

Embodiment 34

A positioning system comprising one or more tracking devices and an apparatus according to embodiment 33.

Embodiment 35

A non-transitory computer readable storage medium in which computer program code is stored, said computer program code when executed by a processor causing at least one apparatus to perform the method according to any of embodiments 20 to 31.

Embodiment 36

An apparatus, said apparatus comprising at least one processor and at least one memory including computer program code, said at least one memory and said computer program code configured to, with said at least one processor, cause said apparatus at least to perform the method according to any of claims 20 to 31.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (1) to a combination of processor(s) or (2) to sections of processor(s)/software (including digital signal processor(s)), software, and memory(ies) that work together to cause an apparatus, such as a mobile phone, to perform various functions) and
(c) to circuits, such as a microprocessor(s) or a section of a microprocessor(s), that re-quire software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or section of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors 100 of FIG. 1 could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions or steps described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

The wording "A, or B, or C, or a combination thereof" or "at least one of A, B and C" may be understood to be not exhaustive and to include at least the following: (1) A, or (2) B, or (3) C, or (4) A and B, or (5) A and C, or (6) B and C, or (7) A and B and C.

It will be understood that all presented embodiments are only exemplary, and that any feature presented for a particular exemplary embodiment may be used with any aspect on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

The invention claimed is:

1. A method comprising:
obtaining or holding available at least one training set of radio signal observation results, wherein a respective training set of radio signal observation results is held available in association with identification information of a corresponding area of interest on a site, wherein the respective training set of radio signal observation results is captured at a corresponding observation position within a corresponding area of interest on said site;
obtaining or holding available area of interest information indicating whether at least one tracking device has been determined to have entered and/or to have been located within a corresponding area of interest on the site;
obtaining or holding available current radio signal observation data of a current tracking device representing one or more current sets of radio signal observation results captured by a radio interface of the current tracking device when present on said site, wherein a respective current set of radio signal observation results is captured at a corresponding observation position on said site; and
determining whether the current tracking device has entered or is located within an area of interest, identification information of which is associated with the at least one training set of radio signal observation results, based on at least one current set of radio signal observation results, based on at least one training set of radio signal observation results associated with the identification information of the area of interest, and based on the area of interest information,
wherein a respective set of radio signal observation results comprises for a corresponding observed radio signal a respective identifier of a radio node, and
wherein a parameter representative of common radio node identifiers corresponds to a number of respective identifiers of the radio node that are common to the at least one training set of radio signal observation results and the at least one current set of radio signal observation results,
wherein the determination whether the current tracking device has entered or is located within an area of interest is further based on a ratio of the parameter representative of common radio node identifiers and another parameter representative of a number of identifiers of the radio node not included in the at least one training set of radio signal observation results and the at least one current set of radio signal observation results.

2. The method according to claim 1, if it is determined based on the at least one training set of radio signal observation results and the at least one current set of radio signal observation results that the current tracking device has entered or is located within an area of interest, identification information of which is associated with the at least one training set of radio signal observation results, the method further comprising:
   determining whether the current tracking device has previously entered or was previously located within the same area of interest, the method further comprising at least one of:
      if it is determined that the current tracking device has previously entered or was previously located within the same area of interest, determining that the current tracking device has entered or is located within the same area of interest;
      if it is determined that the current tracking device has previously entered or was previously located within a different area of interest, determining that the current tracking device has entered or is located within the different area of interest.

3. The method according to claim 2, further comprising at least one of:
   if it is determined that the current tracking device has previously entered or was previously located within the same area of interest, providing notification information and/or or causing an alert indicating that the current tracking device is within the same area of interest;
   if it is determined that the current tracking device has previously entered or was previously located within a different area of interest, providing notification information and/or or causing an alert indicating that the current tracking device is within the different area of interest.

4. The method according to claim 1, wherein the area of interest information is associated with one or more areas of interest and indicates whether at least one tracking device has been determined to have entered and/or to have been located within at least one of the one or more areas associated with the one or more areas of interest associated with the area of interest information; the method further comprising:
   if it is determined that the current tracking device has not previously entered an area of interest associated with the area of interest information or was previously located within an area of interest associated with the area of interest information, determining that the current tracking device has entered or is located within the area of interest, identification information of which is associated with the at least one training set of radio signal observation results.

5. The method according to claim 4, further comprising:
   if it is determined that the current tracking device has not previously entered an area of interest associated with the area of interest information or was previously located within an area of interest associated with the area of interest information, providing notification information and/or or causing an alert indicating that the current tracking device has entered or is located within the area of interest, identification information of which is associated with the at least one training set of radio signal observation results.

6. The method according to claim 1, wherein determining whether the current tracking device is located within the area of interest is based on a parameter representative of a similarity between the at least one current set of radio signal observation results and the at least one training set of radio signal observation results associated with the identification information of the area of interest.

7. The method according to claim 6, wherein the parameter representative of the similarity between the at least one current set of radio signal observation results and the at least one training set of radio signal observation results associated with the identification information of the area of interest is determined based on a reduced at least one current set of radio signal observation results and on a reduced at least one training set of radio signal observation results, wherein a respective reduced set of radio signal observation results is reduced to the radio signal observation results that are common to both the at least one current set of radio signal observation results and the at least one training set of radio signal observation results.

8. The method according to claim 6, wherein the parameter representative of a similarity between the at least one training set of radio signal observation results and the at least one current set of radio signal observation results corresponds to a metric defined based on the at least one reduced training set of radio signal observation results and the at least one reduced current set of radio signal observation results.

9. The method according to claim 1, the method further comprising:
   determining whether the current tracking device is located within the area of interest based on the parameter representative of common radio node identifiers.

10. The method according to claim 1, wherein a respective set of radio signal observation results comprises for a corresponding observed radio signal a respective identifier of a radio node, and wherein a parameter representative of non-common radio node identifiers corresponds to a number of respective identifiers of a radio node that are not common to the at least one training set of radio signal observation results and the at least one current set of radio signal observation results, the method further comprising:
   determining whether the current tracking device is located within the area of interest based on the parameter representative of common radio node identifiers and based on the parameter representative of non-common radio node identifiers.

11. The method according to claim 1, wherein a respective set of radio signal observation results comprises for a corresponding observed radio signal at least one of:
   a respective indication of a received signal strength;
   a respective indication of a signal-to-noise ratio;
   a respective identifier of a radio node.

12. An apparatus for setting an area of interest based on at least one set of radio signal observation results captured by a tracking device, said apparatus comprising at least one processor and at least one memory including computer program code, said at least one memory and said computer program code configured to, with said at least one processor, cause said apparatus to:
   obtain or hold available at least one training set of radio signal observation results, wherein a respective training set of radio signal observation results is held available in association with identification information of a corresponding area of interest on a site, wherein the respective training set of radio signal observation results is captured at a corresponding observation position within a corresponding area of interest on said site;

obtain or hold available area of interest information indicating whether at least one tracking device has been determined to have entered and/or to have been located within a corresponding area of interest on the site;

obtain or hold available current radio signal observation data of a current tracking device representing one or more current sets of radio signal observation results captured by a radio interface of the current tracking device when present on said site, wherein a respective current set of radio signal observation results is captured at a corresponding observation position on said track; and determine whether the current tracking device has entered or is located within an area of interest, identification information of which is associated with the at least one training set of radio signal observation results, based on at least one current set of radio signal observation results, based on at least one training set of radio signal observation results associated with the identification information of the area of interest, and based on the area of interest information, wherein a respective set of radio signal observation results comprises for a corresponding observed radio signal a respective identifier of a radio node, and wherein a parameter representative of common radio node identifiers corresponds to a number of respective identifiers of a radio node that are common to the at least one training set of radio signal observation results and the at least one current set of radio signal observation results, and wherein the determination whether the current tracking device has entered or is located within an area of interest is further based on a ratio of the parameter representative of common radio node identifiers and another parameter representative of a number of identifiers of the radio node not included in the at least one training set of radio signal observation results and the at least one current set of radio signal observation results.

13. The apparatus according to claim 12, if it is determined based on the at least one training set of radio signal observation results and the at least one current set of radio signal observation results that the current tracking device has entered or is located within an area of interest, identification information of which is associated with the at least one training set of radio signal observation results, said at least one memory and said computer program code configured to, with said at least one processor, cause said apparatus further to:

determine whether the current tracking device has previously entered or was previously located within the same area of interest, the method further comprising at least one of:

if it is determined that the current tracking device has previously entered or was previously located within the same area of interest, determine that the current tracking device has entered or is located within the same area of interest;

if it is determined that the current tracking device has previously entered or was previously located within a different area of interest, determine that the current tracking device has entered or is located within the different area of interest.

14. The apparatus according to claim 13, said at least one memory and said computer program code configured to, with said at least one processor, cause said apparatus further to:

if it is determined that the current tracking device has previously entered or was previously located within the same area of interest, provide notification information and/or or causing an alert indicating that the current tracking device is within the same area of interest;

if it is determined that the current tracking device has previously entered or was previously located within a different area of interest, provide notification information and/or or causing an alert indicating that the current tracking device is within the different area of interest.

15. The apparatus according to claim 12, wherein the area of interest information is associated with one or more areas of interest and indicates whether at least one tracking device has been determined to have entered and/or to have been located within at least one of the one or more areas associated with the one or more areas of interest associated with the area of interest information; said at least one memory and said computer program code configured to, with said at least one processor, cause said apparatus further to:

if it is determined that the current tracking device has not previously entered an area of interest associated with the area of interest information or was previously located within an area of interest associated with the area of interest information, determine that the current tracking device has entered or is located within the area of interest, identification information of which is associated with the at least one training set of radio signal observation results.

16. The apparatus according to claim 15, said at least one memory and said computer program code configured to, with said at least one processor, cause said apparatus further to:

if it is determined that the current tracking device has not previously entered an area of interest associated with the area of interest information or was previously located within an area of interest associated with the area of interest information, provide notification information and/or or causing an alert indicating that the current tracking device has entered or is located within the area of interest, identification information of which is associated with the at least one training set of radio signal observation results.

17. The apparatus according to claim 12, wherein determining whether the current tracking device is located within the area of interest is based on a parameter representative of a similarity between the at least one current set of radio signal observation results and the at least one training set of radio signal observation results associated with the identification information of the area of interest.

18. The apparatus according to claim 17, wherein the parameter representative of the similarity between the at least one current set of radio signal observation results and the at least one training set of radio signal observation results associated with the identification information of the area of interest is determined based on a reduced at least one current set of radio signal observation results and on a reduced at least one training set of radio signal observation results, wherein a respective reduced set of radio signal observation results is reduced to the radio signal observation results that are common to both the at least one current set of radio signal observation results and the at least one training set of radio signal observation results.

19. A non-transitory computer readable storage medium in which computer program code is stored, said computer program code when executed by a processor causing at least one apparatus to perform:
- obtaining or holding available at least one training set of radio signal observation results, wherein a respective training set of radio signal observation results is held available in association with identification information of a corresponding area of interest on a site, wherein the respective training set of radio signal observation results is captured at a corresponding observation position within a corresponding area of interest on said site;
- obtaining or holding available area of interest information indicating whether at least one tracking device has been determined to have entered and/or to have been located within a corresponding area of interest on the site;
- obtaining or holding available current radio signal observation data of a current tracking device representing one or more current sets of radio signal observation results captured by a radio interface of the current tracking device when present on said site, wherein a respective current set of radio signal observation results is captured at a corresponding observation position on said track; and
- determining whether the current tracking device has entered or is located within an area of interest, identification information of which is associated with the at least one training set of radio signal observation results, based on at least one current set of radio signal observation results, based on at least one training set of radio signal observation results associated with the identification information of the area of interest, and based on the area of interest information,
- wherein a respective set of radio signal observation results comprises for a corresponding observed radio signal a respective identifier of a radio node, and
- wherein a parameter representative of common radio node identifiers corresponds to a number of respective identifiers of a radio node that are common to the at least one training set of radio signal observation results and the at least one current set of radio signal observation results, and
- wherein the determination whether the current tracking device has entered or is located within an area of interest is further based on a ratio of the parameter representative of common radio node identifiers and another parameter representative of a number of identifiers of the radio node not included in the at least one training set of radio signal observation results and the at least one current set of radio signal observation results.

20. The non-transitory computer readable storage medium according to claim 19, if it is determined based on the at least one training set of radio signal observation results and the at least one current set of radio signal observation results that the current tracking device has entered or is located within an area of interest, identification information of which is associated with the at least one training set of radio signal observation results, said computer program code when executed by a processor causing the at least one apparatus to further perform:
- determining whether the current tracking device has previously entered or was previously located within the same area of interest, the method further comprising at least one of:
  - if it is determined that the current tracking device has previously entered or was previously located within the same area of interest, determining that the current tracking device has entered or is located within the same area of interest;
  - if it is determined that the current tracking device has previously entered or was previously located within a different area of interest, determining that the current tracking device has entered or is located within the different area of interest.

* * * * *